(12) United States Patent
DeGrote et al.

(10) Patent No.: US 12,083,953 B2
(45) Date of Patent: *Sep. 10, 2024

(54) VEHICLE INTERIOR COMPONENT

(71) Applicant: Shanghai Yanfeng Jinqiao Automotive Trim Systems Co. Ltd., Novi, MI (US)

(72) Inventors: Anthony DeGrote, Hudsonville, MI (US); Christopher Kring, Zeeland, MI (US); Scott Allen Hansen, Holland, MI (US)

(73) Assignee: Shanghai Yanfeng Jinqiao Automotive Trim Systems Co. Ltd., Novi, MI (US)

( * ) Notice: Subject to any disclaimer, the term of this patent is extended or adjusted under 35 U.S.C. 154(b) by 705 days.

This patent is subject to a terminal disclaimer.

(21) Appl. No.: 17/230,949

(22) Filed: Apr. 14, 2021

(65) Prior Publication Data

US 2021/0229599 A1 Jul. 29, 2021

Related U.S. Application Data

(63) Continuation of application No. PCT/US2019/056373, filed on Oct. 15, 2019.

(Continued)

(51) Int. Cl.
*B60Q 3/54* (2017.01)
*B60K 35/00* (2024.01)
(Continued)

(52) U.S. Cl.
CPC .............. *B60Q 3/54* (2017.02); *B60K 35/00* (2013.01); *B60R 13/02* (2013.01); *B60K 35/22* (2024.01);
(Continued)

(58) Field of Classification Search
CPC ............ B60R 2013/0283; B60R 13/02; B60K 2370/336; B60K 2370/152; B60Q 3/54
See application file for complete search history.

(56) References Cited

U.S. PATENT DOCUMENTS 2,116,471 A 5/1938 Nelson
4,310,871 A 1/1982 Adachi
(Continued)

FOREIGN PATENT DOCUMENTS

DE 40 06 649 C1 8/1991
DE 10 2006 056 272 A1 5/2008
(Continued)

OTHER PUBLICATIONS

Innovation Q+ NPL Search (Year: 2024).*
(Continued)

*Primary Examiner* — Anabel Ton
(74) *Attorney, Agent, or Firm* — Amin, Turocy & Watson, LLP

(57) ABSTRACT

A vehicle interior component is disclosed. The component may comprise a composite structure comprising a substrate and light guide and surface/cover with holes/pattern of apertures configured for illumination (by a light source/module) to provide an interface/display (with decorative and/or instrumentation region). The light guide may comprise a resin material formed as the set of projections in the pattern of apertures. The cover may comprise a decorative layer with backing configured to provide a visual/surface effect (e.g. natural material, wood veneer, etc.); the display may present a visual/decorative effect when illuminated at the pattern of apertures/light guide. The interface/display at the surface (by illuminated light guide/pattern of holes) may present indicia for a vehicle system and/or decorative effect. The component may comprise a trim/trim panel, instrument panel/dashboard, door panel/armrest, console, overhead trim/headliner, pillar/structure, seat, etc.

20 Claims, 11 Drawing Sheets

Related U.S. Application Data

(60) Provisional application No. 62/808,290, filed on Feb. 20, 2019, provisional application No. 62/748,183, filed on Oct. 19, 2018.

(51) Int. Cl.
   *B60K 35/22* (2024.01)
   *B60R 13/02* (2006.01)

(52) U.S. Cl.
   CPC . *B60K 2360/336* (2024.01); *B60R 2013/0287* (2013.01)

(56) References Cited

U.S. PATENT DOCUMENTS

| | | |
|---|---|---|
| 6,652,128 B2 | 11/2003 | Misaras |
| 7,968,820 B2 | 6/2011 | Hardy et al. |
| 8,394,301 B2 | 3/2013 | Nashner et al. |
| 8,524,127 B2 | 9/2013 | Osako |
| 8,735,740 B2 | 5/2014 | Simenson et al. |
| 9,302,633 B2 | 4/2016 | Stossel et al. |
| 9,568,167 B2 | 2/2017 | Nashner et al. |
| 9,812,042 B2 | 11/2017 | Mulder et al. |
| 2011/0157906 A1 | 6/2011 | Oeuvrard et al. |
| 2014/0355285 A1 | 12/2014 | Yamato |
| 2015/0210226 A1 | 7/2015 | Topart et al. |
| 2015/0274066 A1 | 10/2015 | Del Pozo Gonzalez et al. |
| 2017/0114982 A1 | 4/2017 | Nashner et al. |
| 2018/0022294 A1 | 1/2018 | Hass et al. |
| 2019/0061614 A1 | 2/2019 | Neuner |
| 2019/0176692 A1 | 6/2019 | Betz et al. |
| 2019/0275934 A1 | 9/2019 | Cho et al. |

FOREIGN PATENT DOCUMENTS

| | | | |
|---|---|---|---|
| DE | 10 2007 054 348 A1 | 5/2009 | |
| DE | 10 2004 010 974 B4 | 1/2010 | |
| DE | 10 2008 041 701 A1 | 3/2010 | |
| DE | 10 2008 054 721 B3 | 4/2010 | |
| DE | 10 2009 026 537 A1 | 12/2010 | |
| DE | 102010017494 A1 | 12/2011 | |
| DE | 10 2012 110 153 A1 | 8/2013 | |
| DE | 10 2013 202 223 A1 | 8/2014 | |
| DE | 10 2011 082 344 B4 | 4/2015 | |
| DE | 20 2016 104 031 U1 | 8/2017 | |
| DE | 20 2016 104 100 U1 | 9/2017 | |
| DE | 102016124125 A1 * | 6/2018 | ............ B60K 37/06 |
| DE | 20 2017 104 082 U1 | 8/2018 | |
| DE | 20 2017 104 262 U1 | 8/2018 | |
| DE | 20 2017 104 984 U1 | 9/2018 | |
| DE | 20 2017 105 057 U1 | 10/2018 | |
| DE | 20 2017 105 063 U1 | 10/2018 | |
| DE | 20 2017 105 880 U1 | 11/2018 | |
| DE | 20 2017 105 883 U1 | 11/2018 | |
| EP | 22 18 610 A1 | 8/2010 | |
| EP | 21 02 842 A1 | 2/2013 | |
| EP | 2 435 247 B1 | 10/2013 | |
| EP | 22 33 366 B1 | 3/2014 | |
| EP | 20 60 443 A2 | 8/2016 | |
| FR | 2 936 588 B1 | 1/2014 | |
| FR | 3 040 337 A1 | 3/2017 | |
| FR | 3 053 942 A1 | 1/2018 | |
| JP | 5336276 B2 | 11/2013 | |
| KR | 20020038396 A | 5/2002 | |
| WO | 2009/106190 A1 | 9/2009 | |
| WO | 2010078316 A1 | 7/2010 | |
| WO | 2018/011484 A1 | 1/2018 | |
| WO | WO-2018028817 A1 * | 2/2018 | ............ B60Q 3/14 |
| WO | 2018/082856 A1 | 5/2018 | |
| WO | WO-2020081593 A1 * | 4/2020 | ............ B60K 35/00 |

OTHER PUBLICATIONS

Office Action issued for Chinese Application Serial No. 201980068837.0 dated Jul. 11, 2023, 9 pages.
International Search Report and Written Opinion received for PCT Application Serial No. PCT/US 19/56373 dated Feb. 20, 2020, 15 pages.
Product label, Dribond #160 TSB Brown Thermo-Set Backer (photograph) (no date).
Material Safety Data Sheet (MSDS I), Dribond 160 Series Adhesive Coated Backer Sheets, Lenderink Technologies, Belmont, MI (2 pages) (date prepared: Jun. 1, 2007 (indicated)).
EC-Safety Data Sheet, PWG Veneer Backing VC300+ (trade name), PWG VeneerBackings GmbH, Walkertshofen, Germany (3 pages) (date: Dec. 8, 2015 (indicated)).
Non-Final Office Action for U.S. Appl. No. 16/777,286, dated Jun. 30, 2020.
Extended European Search Report received for E.P Patent Application Serial No. 19873698.5 dated Jun. 9, 2022, 7 pages.

* cited by examiner

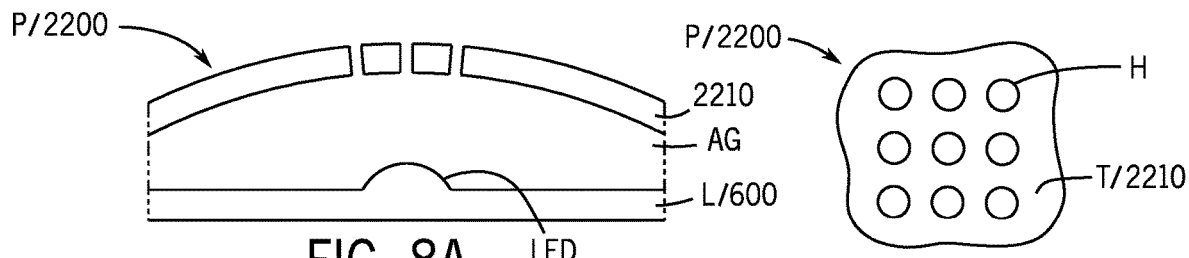
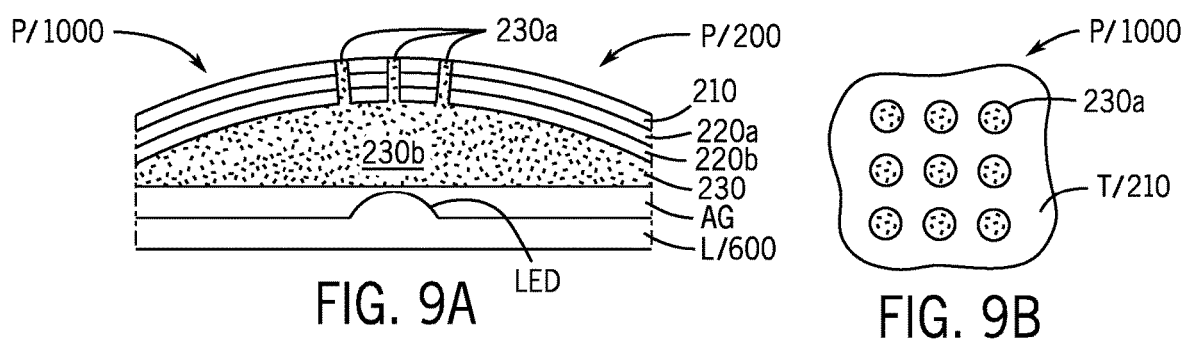
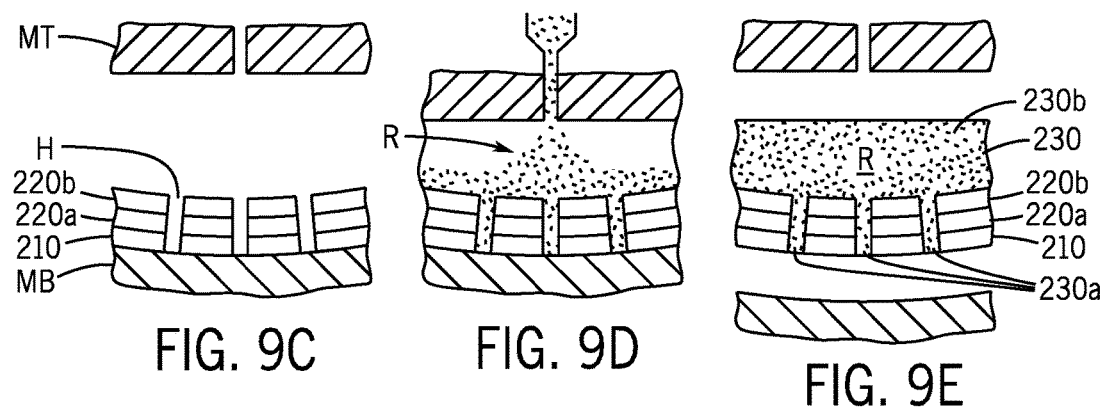
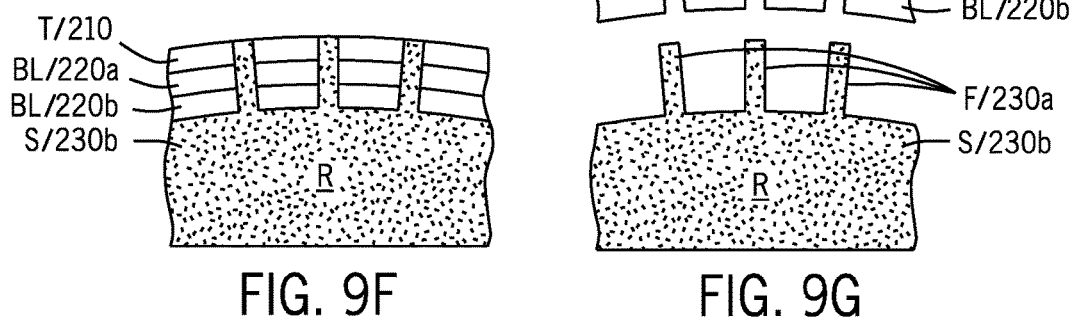
FIG. 8A  FIG. 8B  FIG. 9A  FIG. 9B  FIG. 9C  FIG. 9D  FIG. 9E  FIG. 9F  FIG. 9G

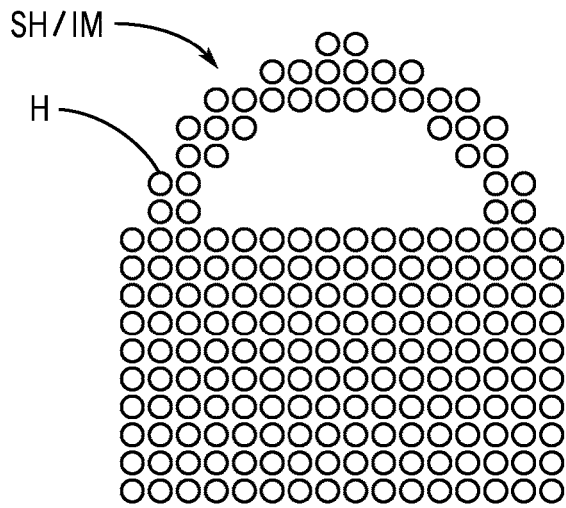
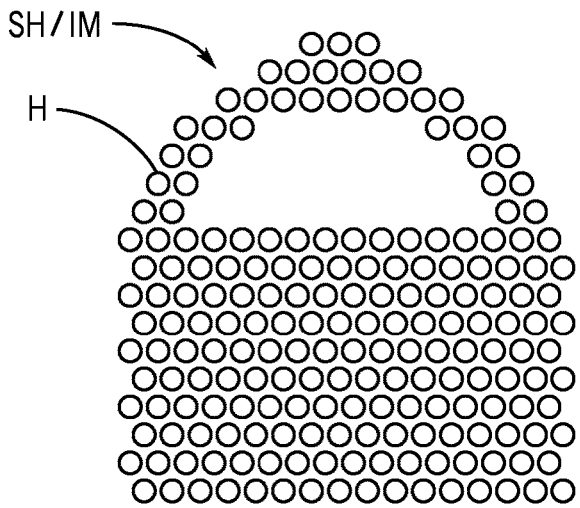
FIG. 14A
FIG. 15A
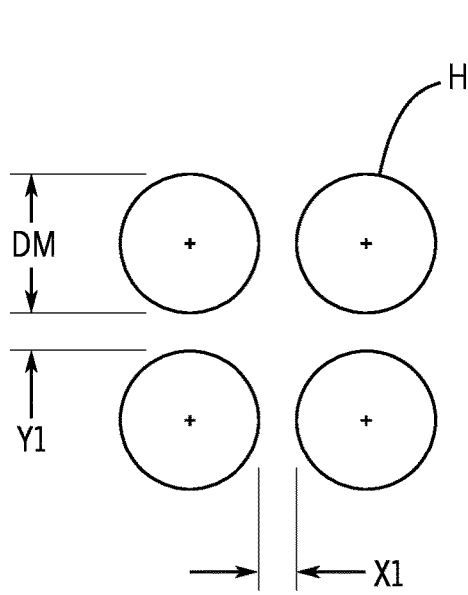
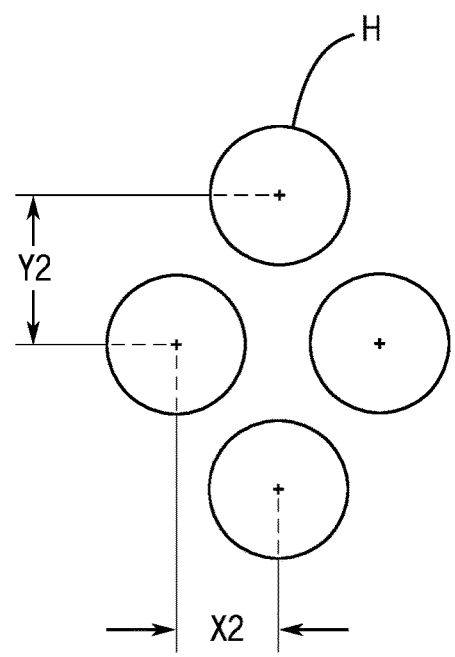
FIG. 14B
FIG. 15B

VEHICLE INTERIOR COMPONENT

CROSS-REFERENCE TO RELATED APPLICATIONS

The present application is a continuation of International/PCT Patent Application No. PCT/US19/56373 titled "VEHICLE INTERIOR COMPONENT" filed Oct. 15, 2019, which claims the benefit of U.S. Provisional Patent Application No. 62/808,290, titled "VEHICLE INTERIOR COMPONENT" filed Feb. 20, 2019 and U.S. Provisional Patent Application No. 62/748,183 titled "VEHICLE INTERIOR COMPONENT" filed Oct. 19, 2018.

The present application claims priority to and incorporates by reference in full the following patent applications: (a) U.S. Provisional Patent Application No. 62/748,183 titled "VEHICLE INTERIOR COMPONENT" filed Oct. 19, 2018; (b) U.S. Provisional Patent Application No. 62/808,290, titled "VEHICLE INTERIOR COMPONENT" filed Feb. 20, 2019, (c) International/PCT Patent Application No. PCT/US19/56373 titled "VEHICLE INTERIOR COMPONENT" filed Oct. 15, 2019; (d) U.S. patent application Ser. No. 16/777,286 (now U.S. Pat. No. 10,821,889) titled "VEHICLE INTERIOR COMPONENT" filed Jan. 30, 2020.

FIELD

The present invention relates to a vehicle interior component.

BACKGROUND

It is known to provide a vehicle interior component configured for illuminated and non-illuminated states.

It would be advantageous to provide an improved vehicle interior component with an improved configuration to provide illumination at the surface or cover.

SUMMARY

The present invention relates to a component for a vehicle interior with a surface intended to be visible to an occupant when the component is installed in the vehicle interior configured to provide illumination from a light source comprising a base, a decorative layer coupled to the base comprising at least one hole and a light guide coupled to the decorative layer. The light guide may comprise a first portion configured to fill the at least one hole in the decorative layer. The component may comprise a backing coupled to a rear surface of the decorative layer. The at least one hole may comprise a pattern of holes configured to provide indicia identifying at least one vehicle control. The decorative layer may comprise a backer configured to prevent illumination to pass from a light source to an outer surface of the decorative layer. The light guide may be formed within the at least one hole of the decorative layer. The decorative layer may be configured to provide a visual effect; the light guide may be configured to provide a visual effect; the visual effect of the decorative layer and the visual effect of the light guide may be configured to provide a composite visual effect.

The present invention relates to a method of manufacturing a vehicle trim component comprising the steps of providing a decorative layer, providing the decorative layer in a tool, at least one of forming and/or cutting the decorative layer into a shape, forming at least one hole in the decorative layer, providing the decorative layer in a mold, injecting a resin in the mold to form a light guide in the at least one hole of the decorative layer, providing a base and joining the decorative layer with the light guide to the base. The light guide may be configured to allow illumination to pass through the at least one hole of the decorative layer. Forming the at least one hole may comprise perforating the decorative layer with a laser. The method may comprise the step of applying a backer to an inner surface of the decorative layer. The step of forming at least one hole in the decorative layer may comprise forming at least one hole in the backer to allow transmission of light through the at least one hole in the backer.

The present invention relates to a component for a vehicle interior comprising a surface configured to be illuminated by a light source to present an interface for an occupant of the vehicle interior comprising a base, a cover layer coupled to the base comprising a pattern of apertures and a light guide coupled to the cover layer. The light guide may comprise a set of projections configured to fit in the pattern of apertures of the cover layer. The light guide may be configured to transmit illumination from the light source to present the interface through the pattern of apertures of the cover layer. The cover layer may comprise a decorative layer for the surface; the decorative layer may comprise at least one of (a) a natural material; (b) a wood veneer; (c) a grained material; (d) a sheet material providing a surface effect. The pattern of apertures may comprise at least one hole configured to at least one of (a) provide an outlet for light configured to provide illumination; (b) direct light to provide illumination. The pattern of apertures may be configured to provide a display. The component may comprise a module configured to provide the light source and at least one sensor for the interface. The component may comprise a backer configured to reinforce the cover layer. The backer may be configured to prevent illumination from the light source to an outer surface of the decorative layer other than at the pattern of apertures. The light guide may comprise a resin material formed as the set of projections in the pattern of apertures. The cover layer may comprise a decorative layer configured to provide a visual effect; the light guide may be configured to provide a visual effect; the visual effect of the decorative layer and the visual effect of the light guide may be configured to provide a composite visual effect.

The present invention relates to a component for a vehicle interior with a surface intended to be visible to an occupant when the component is installed in the vehicle interior configured to provide illumination from a light source comprising: a base; a decorative layer coupled to the base comprising at least one hole; and a light guide coupled to the decorative layer. The light guide may comprise a first portion configured to fill the at least one hole in the decorative layer. The decorative layer may comprise a thickness generally between 0.005 inches and 0.05 inches. The decorative layer may comprise a rear surface; the light guide may comprise a second portion configured to align with the rear surface of the decorative layer and guide light from a light source to the first portion of the light guide. The decorative layer may comprise a natural material. The decorative layer may comprise a wood veneer. The component may further comprise a backing coupled to a rear surface of the decorative layer. The backing may comprise at least one backer attached to the rear surface of the decorative layer. The at least one backer may comprise a sheet material; the at last one hole may comprise a set of holes through the decorative layer and the sheet material of the at least one backer; the set of holes may be configured (a) to provide an outlet for light configured to provide illumination and/or (b) to direct light to provide illumination at the surface. The at least one hole may be configured to at least one of (a) provide an outlet for light configured to provide illumination; (b) direct light to provide illumination at the surface. The at least one hole may comprise a pattern of holes configured to provide indicia identifying at least one vehicle control. The decorative layer may comprise a backer configured to prevent illumination to pass from a light source to an outer surface of the decorative layer. The light guide may be formed within the at least one hole of the decorative layer. The light guide may comprise a light-transmissive resin material formed in the at least one hole of the decorative layer. The decorative layer may be configured to provide a visual effect; the light guide may be configured to provide a visual effect; the visual effect of the decorative layer and the visual effect of the light guide may be configured to provide a composite visual effect. The surface may be configured for a first state providing the visual effect of the decorative layer and a second state providing the composite visual effect of the visual effect of the light guide and the visual effect of the decorative layer. The at least one hole may comprise a pattern of holes; the base may comprise at least one of (a) module; (b) a switch; (c) a sensor; (d) a capacitive switch; (e) a capacitive switch sensor aligned with the pattern of holes; the pattern of holes may be configured to illuminate the decorative layer to indicate a position of the switch; the capacitive switch; the capacitive switch sensor. The component may comprise at least one of a trim panel; an armrest; a headliner; a dashboard; a console; a center console; a door panel; a steering wheel; a seat; a pillar; a roof pillar; pillar trim.

The present invention relates to a method of manufacturing a vehicle trim component comprising the steps of: (a) providing a decorative layer; (b) providing the decorative layer in a tool; (c) at least one of forming; cutting the decorative layer into a shape; (d) forming at least one hole in the decorative layer; (e) providing the decorative layer in a mold; (f) injecting a resin in the mold to form a light guide in the at least one hole of the decorative layer; (g) providing a base; (h) joining the decorative layer with the light guide to the base. The light guide may be configured to allow illumination to pass through the at least one hole of the decorative layer. Forming the at least one hole may comprise perforating the decorative layer with a laser. The method may further comprise the step of applying a backer to an inner surface of the decorative layer. The backer may comprise a barrier configured to prevent transmission of light. The step of forming at least one hole in the decorative layer may comprise forming at least one hole in the backer to allow transmission of light through the at least one hole in the backer. The backer may comprise at least one layer of backing material. The backing material may comprise a sheet material attached to the inner surface of the decorative layer.

The present invention relates to a component for a vehicle interior comprising a surface configured to be illuminated by a light source to present an interface for an occupant of the vehicle interior comprising: a base; a cover layer coupled to the base comprising a pattern of apertures; and a light guide coupled to the cover layer. The light guide may comprise a set of projections configured to fit in the pattern of apertures of the cover layer; the light guide may be configured to transmit illumination from the light source to present the interface through the pattern of apertures of the cover layer. The cover layer may comprise a decorative layer for the surface; the decorative layer may comprise at least one of (a) a natural material; (b) a wood veneer; (c) a grained material; (d) a sheet material providing a surface effect. The pattern of apertures may comprise at least one hole configured to at least one of (a) provide an outlet for light configured to provide illumination; (b) direct light to provide illumination. The pattern of apertures may be configured to provide a display. The display may comprise at least one of a decorative region and an instrumentation region. The instrumentation region may comprise indicia identifying at least one vehicle control. The component may further comprise a module configured to provide the light source and at least one sensor for the interface. The component may further comprise a backer configured to reinforce the cover layer. The backer may comprise at least one backing layer. The backer may comprise the pattern of apertures so that illumination from the light source passes through the backer to the surface to provide the interface. The backer may be configured to prevent illumination from the light source to an outer surface of the decorative layer other than at the pattern of apertures. The light guide may comprise a light-transmissive resin material. The light guide may comprise a resin material formed as the set of projections in the pattern of apertures. The cover layer may comprise a decorative layer configured to provide a visual effect; the light guide may be configured to provide a visual effect; the visual effect of the decorative layer and the visual effect of the light guide may be configured to provide a composite visual effect. The interface may comprise a first state providing the visual effect of the decorative layer and a second state providing the composite visual effect of the visual effect of the light guide and the visual effect of the decorative layer. The first state may comprise an unilluminated state and the second state may comprise an illuminated state.

The present invention relates to a vehicle interior component comprising a composite structure comprising a surface/cover and a substrate and configured to be illuminated in a decorative region by a light source and in an instrumentation region by a module.

The present invention relates to a component for a vehicle interior with a surface intended to be visible to an occupant when the component is installed in the vehicle interior configured to provide illumination from a light source comprising a base, a decorative layer coupled to the base comprising at least one hole and a light guide coupled to the decorative layer. The light guide may comprise a first portion configured to fill the at least one hole in the decorative layer. The decorative layer may comprise a thickness generally between 0.005 inches and 0.05 inches. The decorative layer may comprise a rear surface; the light guide may comprise a second portion configured to align with the rear surface of the decorative layer and guide light from a light source to the first portion of the light guide. The decorative layer may comprise a natural material. The decorative layer may comprise a wood veneer. The at least one hole may be configured to at least one of (a) provide an outlet for light configured to provide illumination; (b) direct light to provide illumination. The at least one hole may comprise a pattern of holes configured to provide indicia identifying or associated with at least one vehicle system (e.g. instrumentation, control, etc.). The base may comprise at least one of (a) a switch (b) a sensor (c) a capacitive switch (d) a capacitive switch sensor aligned with the pattern of holes; the pattern of holes may be configured to illuminate the decorative layer to indicate a position of the switch, the capacitive switch, the capacitive switch sensor. The decorative layer may comprise a backing/backer configured to prevent illumination to pass from a light source to an outer surface of the decorative layer. The light guide may be formed within the at least one hole of the decorative layer. The decorative layer may be configured to provide a visual effect; the light guide may be configured to provide a visual effect; the visual effect of the decorative layer and the visual effect of the cover may be configured to provide a composite visual effect. The component may be configured for a first state providing the visual effect of the decorative layer and a second state providing the composite visual effect of the visual effect of the light guide and the visual effect of the decorative layer. The component may comprise at least one of a trim panel; an armrest; a headliner; a dashboard; a console; a center console; a door panel; a steering wheel; a seat; a pillar, a roof pillar, pillar trim.

The present invention also relates to a method of manufacturing a vehicle trim component comprising the steps of providing a decorative layer; disposing the decorative layer in a tool; at least one of forming; cutting the decorative layer into a shape; forming at least one hole in the decorative layer; disposing the decorative layer in a mold; injecting a resin in the mold to form a light guide in the at least one hole of the decorative layer; providing a base; joining the decorative layer with the light guide to the base. The light guide may be configured to allow illumination to pass through the at least one hole of the decorative layer. Forming the at least one hole may comprise perforating the decorative layer with a laser. The method may comprise the step of applying a backing/backer to an inner surface of the decorative layer. The backing/backer may comprise a barrier configured to prevent transmission of light. Forming at least one hole in the decorative layer may comprise forming at least one hole in the backing/backer to allow transmission of light through the at least one hole in the backing/backer.

The present invention relates to a component for a vehicle interior configured to be illuminated by a light source to present an interface for an occupant of the vehicle interior. The component may comprise a base, a cover layer coupled to the base comprising a pattern of apertures and a light guide coupled to the cover layer. The light guide may comprise a set of projections configured to fit in the pattern of apertures of the cover layer. The light guide may be configured to transmit illumination from the light source to present the interface through the pattern of apertures of the cover layer.

FIGURES

FIG. 8A is a schematic cut-away section view of a conventional vehicle interior component according to an exemplary embodiment.

FIG. 8B is a schematic cut-away plan view of a conventional vehicle interior component according to an exemplary embodiment.

FIG. 9A is a schematic cut-away section view of a vehicle interior component according to an exemplary embodiment.

FIG. 9B is a schematic cut-away plan view of a vehicle interior component according to an exemplary embodiment.

FIGS. 9C to 9E are schematic section views of a process to produce a vehicle interior component according to an exemplary embodiment.

FIG. 9F is a schematic cut-away section view of a decorative panel of a vehicle interior component according to an exemplary embodiment.

FIG. 9G is a schematic cut-away exploded section view of a decorative panel of a vehicle interior component according to an exemplary embodiment.

FIGS. 14A and 14B are schematic cut-away section views of a decorative panel of a vehicle interior component according to an exemplary embodiment.

FIGS. 15A and 15B are schematic cut-away section views of a decorative panel of a vehicle interior component according to an exemplary embodiment.

DESCRIPTION

Figures 1A, 1B:
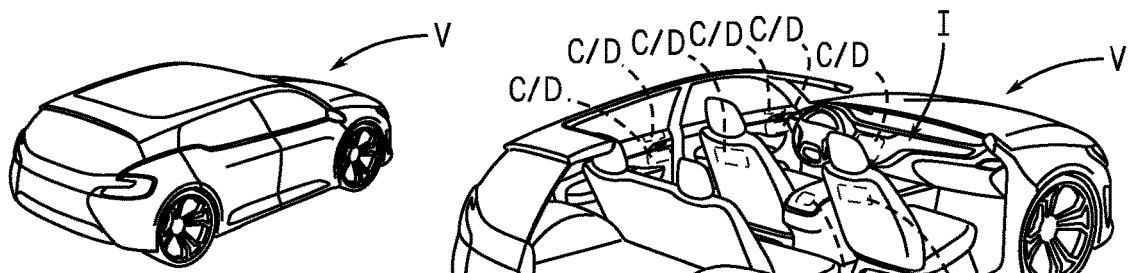
FIG. 1A is a schematic perspective view of a vehicle according to an exemplary embodiment.
FIG. 1B is a schematic perspective cut-away view of a vehicle showing an interior according to an exemplary embodiment.

Referring to FIGS. 1A and 1B a vehicle V providing an interior I is shown according to an exemplary embodiment. The interior I of the vehicle V may comprise interior components/systems including panels (e.g. instrument panel, door panels, etc.) and consoles (e.g. floor console, overhead console, etc.) and other trim components. See also FIGS. 1B, 2A, 4A and 5A.

Figures 2A, 2B, 2C:
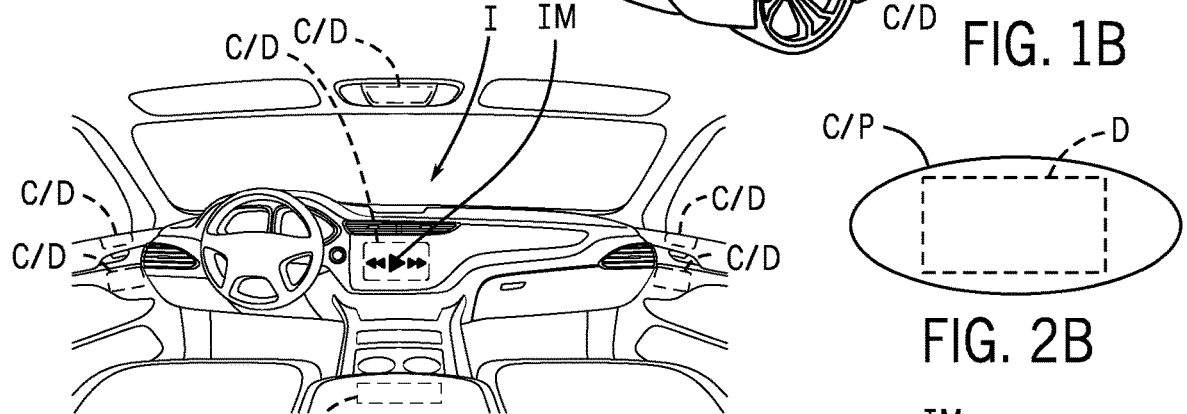
FIG. 2A is a schematic rear cut-away view of a vehicle showing an interior according to an exemplary embodiment.
FIG. 2B is a schematic diagram of a vehicle interior component comprising a display according to an exemplary embodiment.
FIG. 2C is a schematic cut-away plan view of a vehicle interior component comprising a display according to an exemplary embodiment.
Figures 3A, 3B:
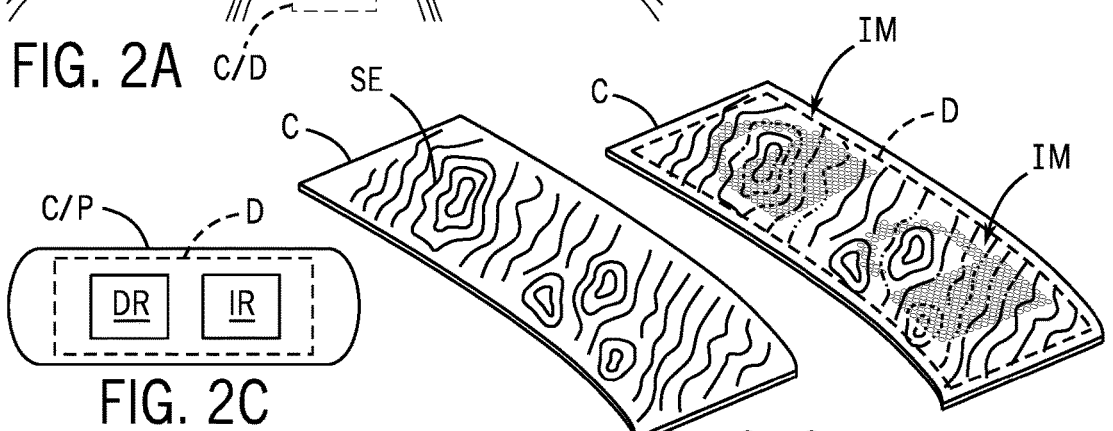
FIGS. 3A and 3B are schematic perspective views of a vehicle interior component according to an exemplary embodiment.
Figures 3C, 3D:
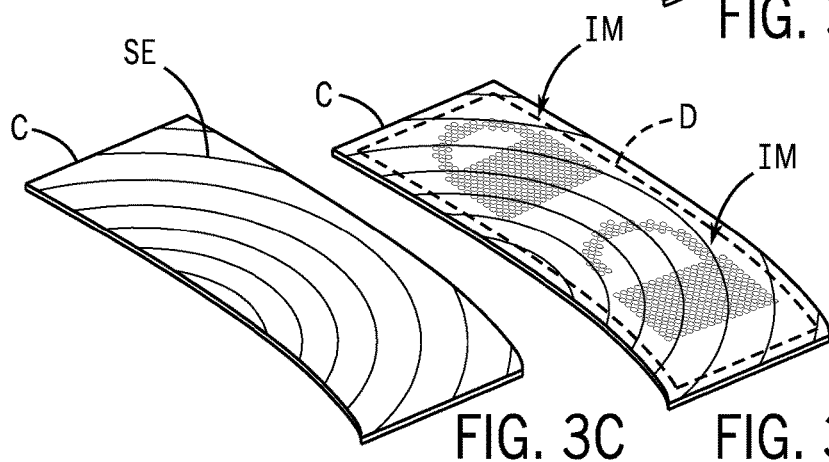
FIGS. 3C and 3D are schematic perspective views of a vehicle interior component according to an exemplary embodiment.

According to an exemplary embodiment as shown schematically in FIGS. 1B and 2A, the interior of the vehicle may comprise components C configured to provide a user interface/system such as through a display D configured to display an image IM As shown schematically in FIGS. 2A and 3A-3C, the user interface system/component C may comprise a surface/panel providing a surface effect SE (e.g. texture, color, contour, visual effect, image display, etc.); as shown schematically in FIGS. 3A and 3B, the component C may comprise a surface effect SE such as wood trim/grain (e.g. wood veneer, finish, etc.); as shown schematically in FIGS. 3C and 3D, the component C may comprise a surface effect SE such as formed/molded contour (e.g. with visual/texture effect such as plastic, metallic, natural materials, etc.).

As indicated schematically according to an exemplary embodiment in FIGS. 3A-3D, the component C may be configured to be illuminated (e.g. from a light source). See also FIG. 7 (e.g. light source L with lighting/control module M). As indicated schematically in FIGS. 3A and 3C, until illumination is provided the component C may be configured to present the general appearance of the cover/surface (e.g. wood veneer/surface as in FIG. 3A or contour/surface as in FIG. 3B). As indicated schematically in FIGS. 3B and 3D, when illumination is provided (e.g. from light source L through the substrate/surface to the cover/surface) the component C may be configured to present through the surface effect an intended visible effect shown as an image IM (e.g. illuminated image visible through/at/on the surface). As indicated schematically, the image IM is presented as an illuminated form at the surface (e.g. user interface) of the component C. See FIGS. 3B and 3D (showing image IM in the form of an icon set of a type as may indicate a locked or unlocked status of a vehicle door or other system). As shown schematically in FIGS. 3B, 3D, 14A-14B and 15A-15B, the image SH/IM presenting the icon set to indicated an locked/unlocked state may comprise a set of apertures/perforations shown as holes H through the cover/surface (e.g. holes through the cover and any intermediate layer such as a backing/layer of a material that is not light-transmissive) to transmit light from the light source (e.g. to present a back-lit image from a form presented at the light source and/or by arrangement/pattern of the holes). See also FIGS. 11A-11C, 12A-12C and 13A-13B.

Figure 4A:
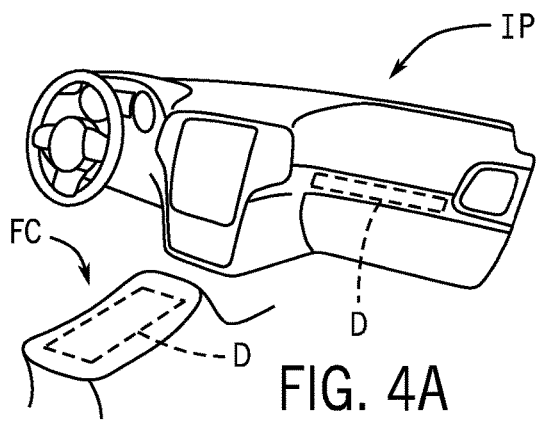
FIG. 4A is a schematic perspective view of a vehicle interior component shown as an instrument panel according to an exemplary embodiment.
Figure 4B:
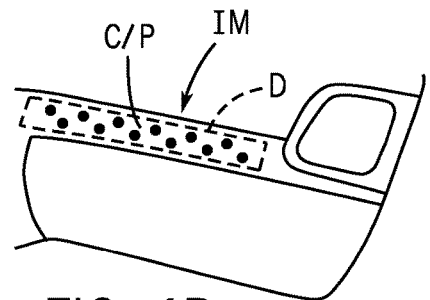
FIG. 4B is a schematic partial perspective view of a vehicle interior component shown as an instrument panel according to an exemplary embodiment.
Figure 4C:
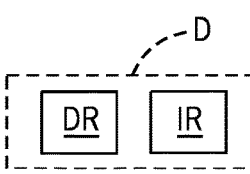
FIG. 4C is a schematic diagram of a vehicle interior component comprising a display according to an exemplary embodiment.
Figure 5A:
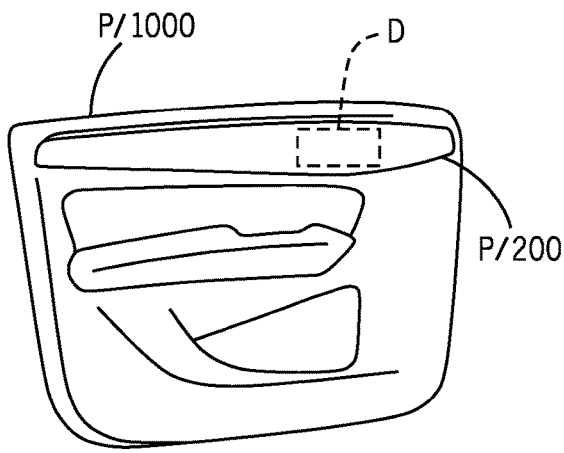
FIG. 5A is a schematic perspective view of a vehicle interior component shown as a door panel according to an exemplary embodiment.

As shown schematically in FIGS. 4A-4B and 5A-5D, the component P may be configured for implementation in a decorative trim part/component C/P shown as a floor console FC to present a display D for an instrument panel IP or as a trim component P/200 for a door panel P/1000; according to an exemplary embodiment the trim part/component may be configured as any of a variety of other interior trim components for a vehicle (including a decorative trim component/product). As shown schematically in FIGS. 4B and 5B, the trim component may provide a surface on which may be presented an ornamental design/visible effect shown as image IM (when illuminated by a light source/back-lit display). See also FIGS. 6B-6D. As indicated in FIGS. 4A and 5A, unless/until illuminated by the light source (e.g. until back-lit from the light source) the trim component may present the surface effect (without an image). See also FIGS. 3A, 3C, 4A, 5A and 6A.

Referring to FIGS. 2B-2C, 4C, 6, 6A-6D and 7, the component/product P may comprise a user interface comprising a decorative region DR where an ornamental design/visible effect such as a decorative image may be presented (e.g. a decorative image made visible on the surface as in FIG. 6B) and an instrumentation region IR where a visible effect such as content in the form of information/signals may be presented (e.g. content made visible on the surface as in FIG. 6C); as indicated schematically, when the component/user interface is illuminated the image may be presented/projected through the surface effect SE of the cover of the component shown as a wood trim/grain effect W (which effect is visible when the image is not presented). Compare FIGS. 6A (off/unilluminated) and 6D (illuminated).

Figure 6:
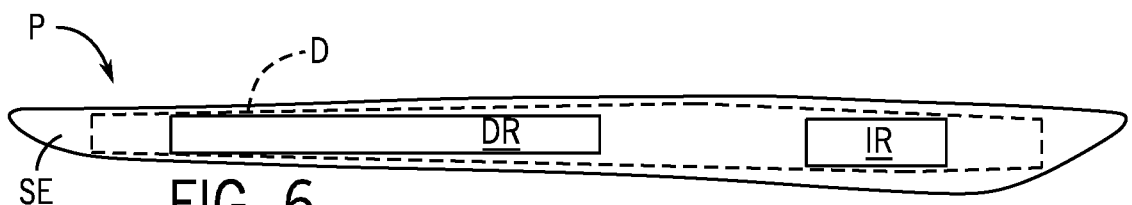
FIG. 6 is a schematic plan view of a vehicle interior component according to an exemplary embodiment.
Figure 6A:
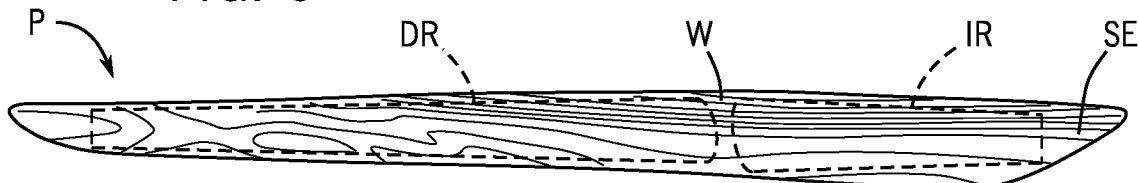
FIG. 6A is a schematic plan view of a vehicle interior component according to an exemplary embodiment.
Figures 6B, 6C:
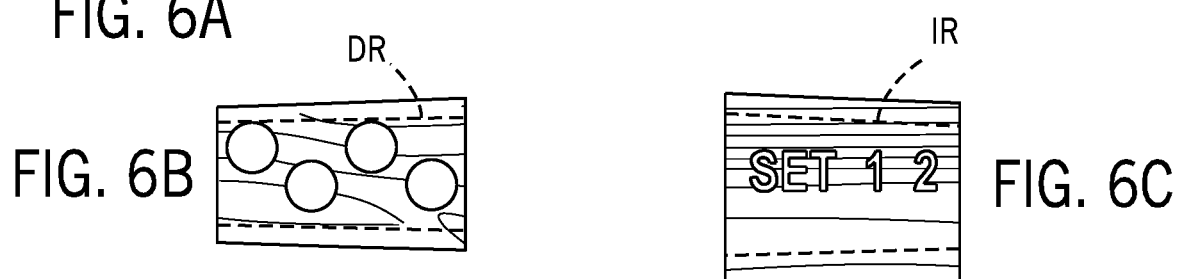
FIG. 6B is a schematic cut-away plan view of a vehicle interior component according to an exemplary embodiment.
FIG. 6C is a schematic cut-away plan view of a vehicle interior component according to an exemplary embodiment.
Figure 6D:
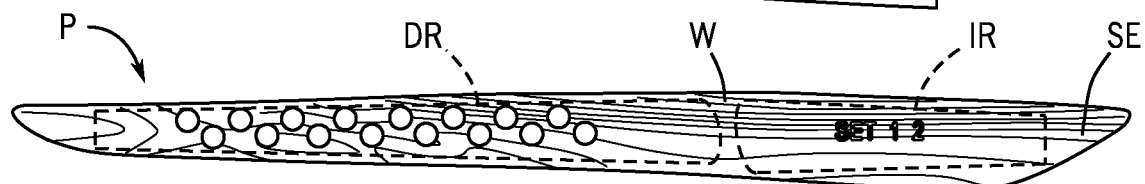
FIG. 6D is a schematic plan view of a vehicle interior component according to an exemplary embodiment.
Figure 7:
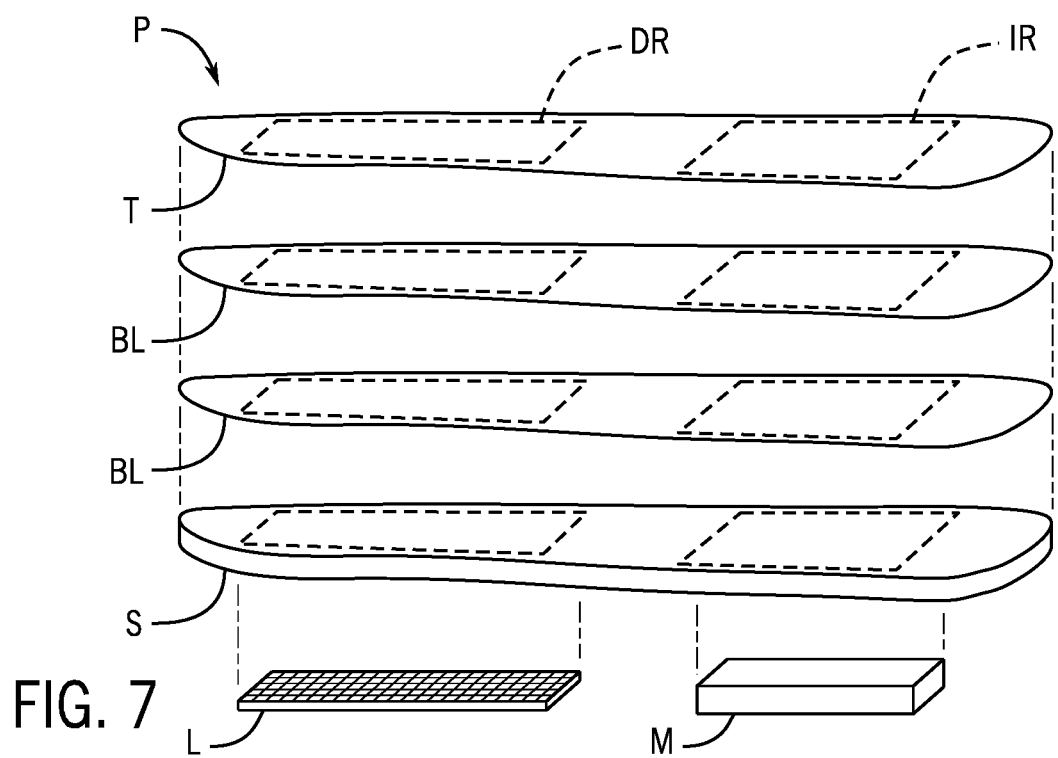
FIG. 7 is a schematic exploded view of a vehicle interior component according to an exemplary embodiment.
Figures 10, 10A, 10B, 10C:
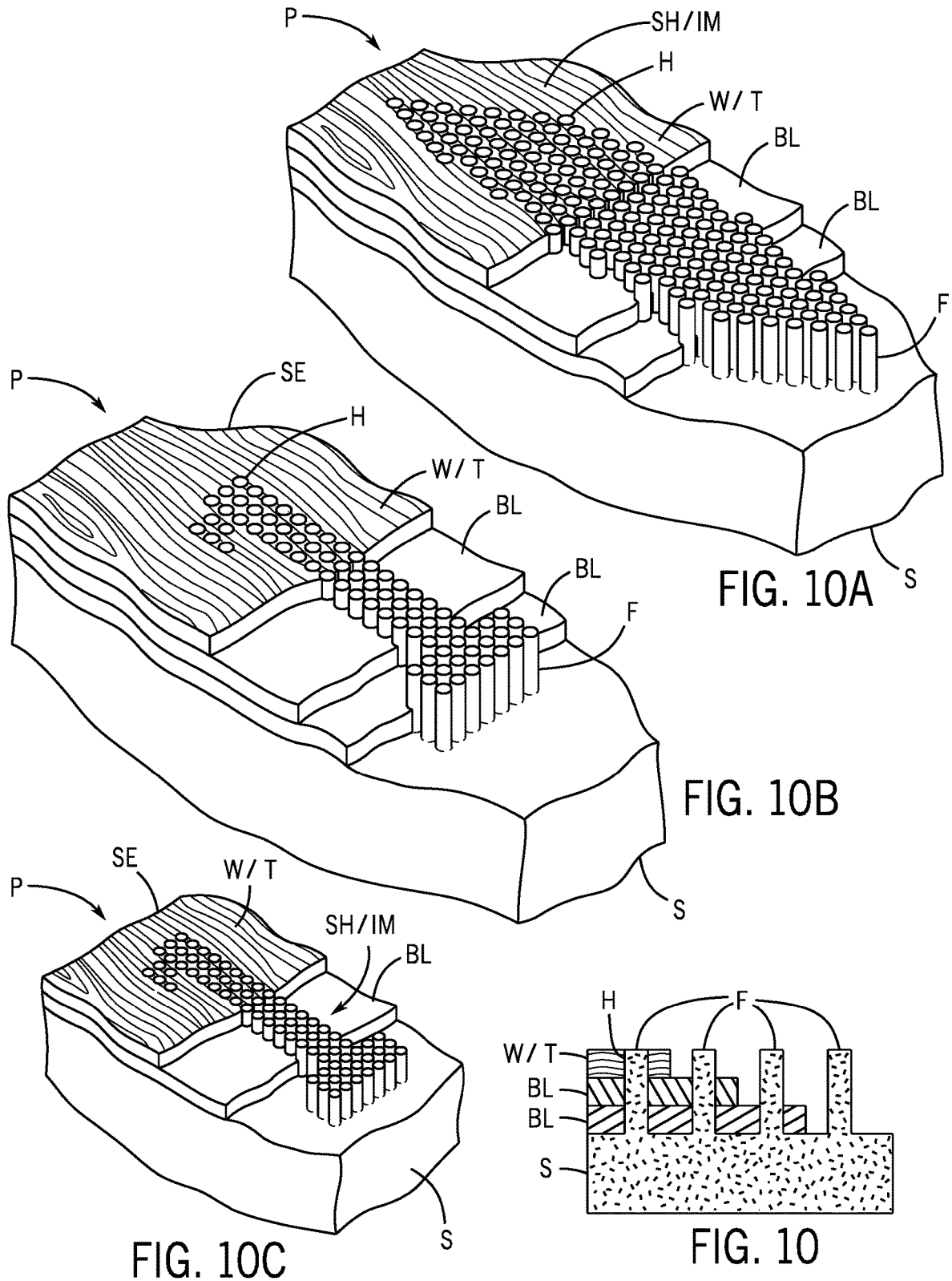
FIG. 10 is a schematic cut-away section view of a vehicle interior component according to an exemplary embodiment.
FIG. 10A is a schematic perspective cut-away view of a vehicle interior component according to an exemplary embodiment.
FIG. 10B is a schematic perspective cut-away view of a vehicle interior component according to an exemplary embodiment.
FIG. 10C is a schematic perspective cut-away view of a vehicle interior component according to an exemplary embodiment.
Figure 10D:
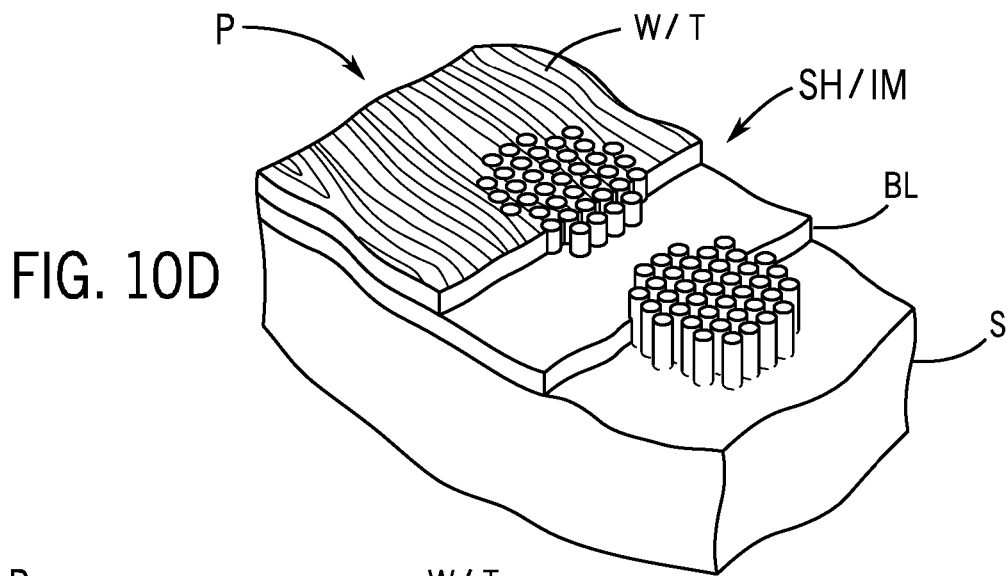
FIG. 10D is a schematic perspective cut-away view of a vehicle interior component according to an exemplary embodiment.
Figure 10E:
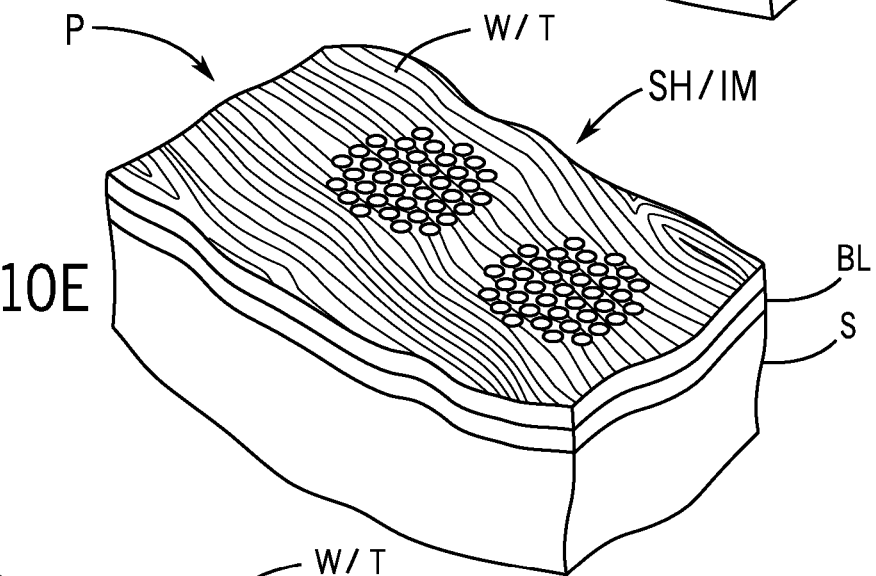
FIG. 10E is a schematic perspective cut-away view of a vehicle interior component configured to present a display/image according to an exemplary embodiment.
Figure 10F:
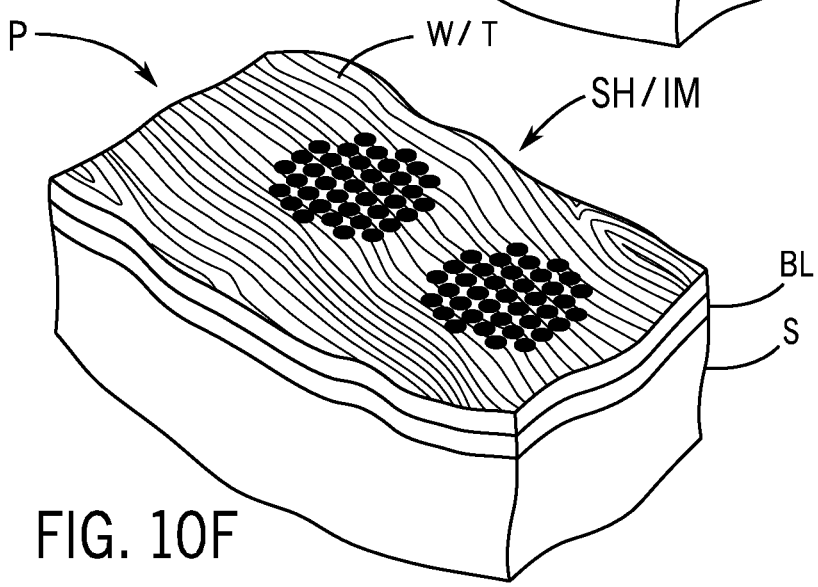
FIG. 10F is a schematic perspective cut-away view of a vehicle interior component configured to present a display/image according to an exemplary embodiment.
Figure 11A:
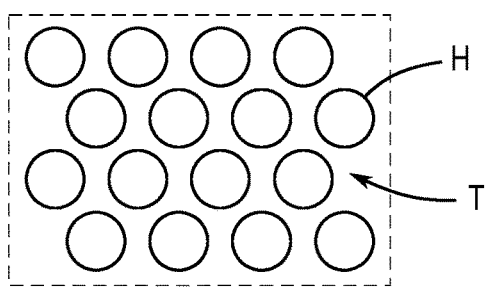
FIG. 11A is a schematic cut-away plan view of a vehicle interior component according to an exemplary embodiment.
Figure 11B:
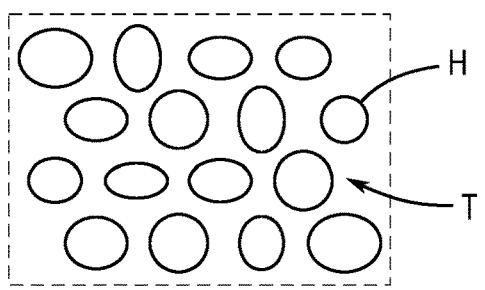
FIG. 11B is a schematic cut-away plan view of a vehicle interior component according to an exemplary embodiment.
Figure 11C:
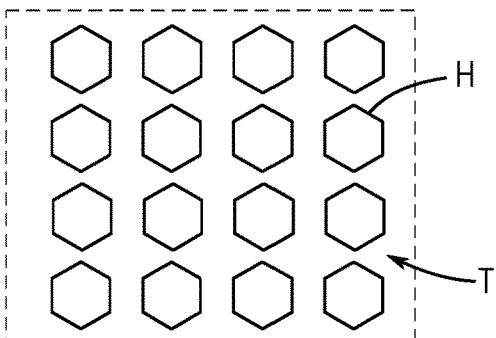
FIG. 11C is a schematic cut-away plan view of a vehicle interior component according to an exemplary embodiment.
Figure 13A:
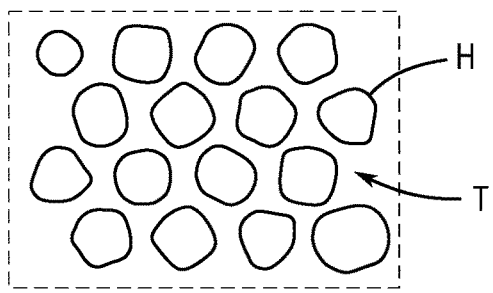
FIG. 13A is a schematic cut-away plan view of a vehicle interior component according to an exemplary embodiment.
Figure 12A:
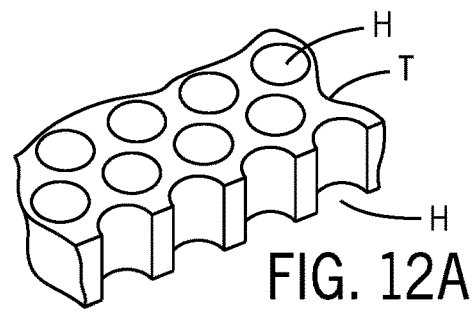
FIG. 12A is a schematic cut-away perspective view of a vehicle interior component according to an exemplary embodiment.
Figure 12B:
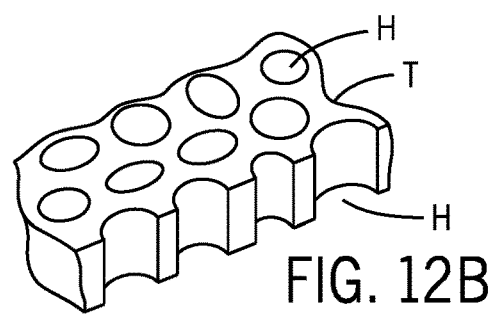
FIG. 12B is a schematic cut-away perspective view of a vehicle interior component according to an exemplary embodiment.
Figure 12C:
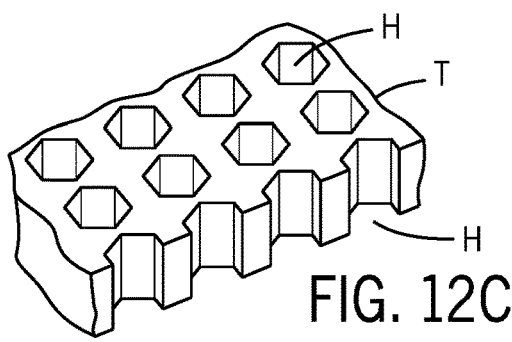
FIG. 12C is a schematic cut-away perspective view of a vehicle interior component according to an exemplary embodiment.
Figure 13B:
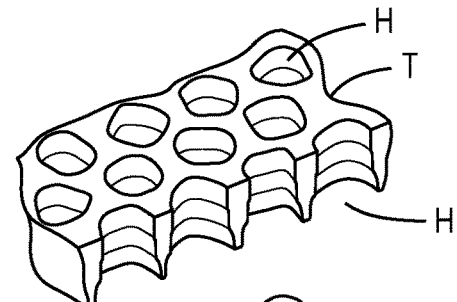
FIG. 13B is a schematic cut-away exploded perspective view of a vehicle interior component according to an exemplary embodiment.
Figure 13B:
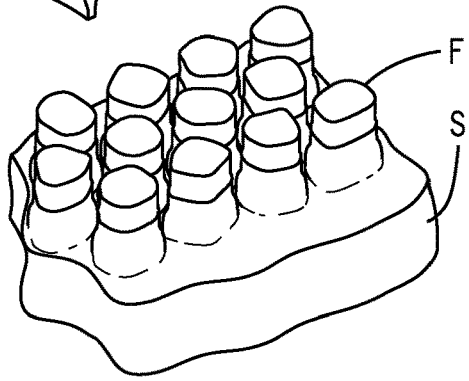

As indicated schematically in FIGS. 6A-6D, trim component product P is provided with a surface effect shown as wood trim/grain W that may be configured to provide an intended ornamental design/visible effect in a decorative region DR when provided with back-lit illumination (e.g. from module L in FIG. 7) and an information/instrumentation display in an instrumentation region IR when provided with back-lit illumination (e.g. from module M in FIG. 7). As shown schematically according to an exemplary embodiment in FIG. 6A, the product P presents the surface effect of the wood trim/grain W (e.g. cover layer) until illumination is provided (e.g. until back lit from the light source L). As shown schematically in FIGS. 6B and 6D, when the decorative region DR is illuminated (e.g. back lit from light source L) the ornamental/visual effect shown as a decorative image of a specified industrial design (e.g. an illuminated arrangement of circle-shaped forms) is presented on the wood trim/grain surface W of the product P; as shown schematically in FIGS. 6C and 6D, when the instrumentation region IR is illuminated (e.g. back lit from light source M) the information/data display is presented on the wood trim/grain surface W of the product P. See also FIG. 4B.

As shown schematically according to an exemplary embodiment in FIG. 7, the component/product P may comprise a composite structure comprising a cover/top layer P (e.g. providing the surface/surface effect) and a backing layer (shown as backing layers BL) and a substrate S (which may comprise or be attached to a carrier/structure); as shown schematically in FIG. 7, a light source L (e.g. an LED array/substrate aligned with the decorative region DR) and an instrumentation module M (e.g. a module comprising a light source aligned with the instrumentation region IR may be provided to illuminate and/or actuate the user interface.

Referring to FIGS. 9A and 9B, the component/product P/200 may comprise a composite structure with a light array/module L/600 (comprising a light source such as an LED/array) and a substrate/light guide 230 (comprising a light-transmitting and/or generally transparent material 230b) supporting the surface/cover T/210 with backing shown as layers 220a/220b (e.g. backing layer BL of a material such as paper, film, foil, fiber, sheet material, etc.); as indicated schematically, holes are provided in the surface/cover with backing for transmission of light from the light source L/600 through the substrate/fill 230a/230b. See also FIG. 9B (showing surface with substrate S/fill 230a of a light-transmissive material for transmission of light from light source as a light guide).

As shown schematically according to an exemplary embodiment in FIGS. 9C-9F, the component may be formed by injection molding (e.g. in a tool comprising mold sections MT and MB) of the material for substrate S/fill 230 (e.g. transparent and/or light-transmitting material) onto the cover/backing into which holes have been provided; the substrate material 230 forms projections 230a (e.g. shown as posts of the light-transmissive transparent/translucent substrate material) into the holes; the projections/fill posts are configured to function as light guides. See also FIGS. 9F and 9G.

As shown schematically in FIGS. 3A-3D, 10 and 10A-10F, according to an exemplary embodiment, the component product P may comprise a cover shown as wood veneer/surface W (wood trim/grain) with a backing shown as layer arrangement BL over a substrate S; the surface of the product P (e.g. component C with display D) may be configured to be illuminated (e.g. from light source L on underside below substrate) through the wood trim cover W and backing arrangement BL through an pattern/arrangement of a series of apertures/holes H; the apertures/holes are filled with posts/fill material F (e.g. light-transmissive transparent/translucent resin R molded with substrate S under the cover/backing). See also FIGS. 9A-9G, 13A-13B, 18B-18C, 19B-19C, 20A_20D and 21B-21C. As shown schematically in FIGS. 3B, 3D, 4A, 5A, 6A-6D, pattern/arrangement for the apertures/holes H and corresponding posts/fill material F may comprise a shape/image SH/IM such as a geometric form, a symbol, etc. to present the ornamental/visual effect or information/display (e.g. illuminated form when illuminated from the light source L/M) on the wood trim/grain surface W of the product P. See also FIGS. 2B-2C, 4C, 9A-9G and 10A-10F.

As indicated schematically in FIGS. 6A, 6D, 7 and 10A-10D, until illumination is provided (e.g. from light source L/M through the substrate/fill material F for holes H) the back-lit decorative trim component product P may be configured to present the general appearance of the wood veneer/surface W in decorative region DR and instrumentation region IR; when illumination is provided (e.g. from light source L through the substrate/fill material F for holes H) the back-lit decorative trim component product P/Pa may be configured to present an intended ornamental design/visible effect in decorative region DR and/or information display at instrumentation region IR through the wood veneer/surface W.

As shown schematically in FIGS. 11A-11C, 12A-12C and 13A, the cover/layer T may comprise holes H that are presented in a pattern intended to be uniform but in variety of sizes forms/shapes (e.g. circular, elongated, hexagonal, irregular, etc.). See also FIGS. 16 and 17 (showing laser tool/system LT providing beam LB and cutting tool CT to form holes in cover/backing T). As shown schematically in FIG. 13B, the fill/posts F formed of the substrate material (e.g. formed material configured to be light-transmissive, translucent, transparent, etc.) will take the form of the hole/aperture in the cover/backing; uniformly shaped holes will be formed with uniformly shaped/formed fill/posts (see FIGS. 18A-18C and 20A-20B); irregularly shaped holes will be filled with irregularly shaped/formed posts (see FIGS. 19A-19C, 20C-20D and 21A-21C). See also FIGS. 9A-9G.

As shown schematically according to an exemplary embodiment, the wood veneer cover/layer (front) and backing layer (e.g. paper/sheet behind wood veneer cover/layer) (rear) may comprise holes/apertures (e.g. perforations formed by laser tool). As shown schematically, the surfaces/consistency of the wood veneer cover/layer and the backing layer comprise an irregular form (e.g. with notable variations in surface, evenness, etc.); the holes/apertures formed through the cover/backing comprise an irregular form (e.g. with variations in size, evenness, etc.). See FIGS. 13A-13B, 19A-19C, 20C-20D and 21A-21C. As shown schematically in FIGS. 14A-14B and 15A-15B, the hole arrangement with holes H of intended/effective diameter DM for the image SH/IM on the surface of the composite structure/component may be configured in a grid pattern alignment with spacing X1/Y1 (on hole borders) or in an offset/nested pattern with spacing X2/Y2 (on hole centers). Compare FIGS. 11A/11C and 11B/13A (showing irregular form/pattern for hole arrangement). As indicated schematically in FIGS. 13A-13B, the hole patterns in a material such as a fiber sheet/veneer may comprise irregularities. See also FIGS. 19A-19C, 20C-20D and 21A-21C.

As shown schematically in according to an exemplary embodiment in FIG. 15, a configuration for forming holes/apertures (e.g. perforations) by laser tool/system LT providing laser beam LB is shown; settings/configuration for the laser tool may comprise the frequency/density of the laser-formed/applied holes and the width of the line between the laser-formed/applied holes; as indicated schematically, the laser-formed/applied holes in the cover/backing of the component may comprise variations in form/shape (e.g. generally circular, hexagonal, irregular due to material variations, etc.) according to an exemplary embodiment (e.g. for forming holes/apertures (e.g. dot frequency and line width for image for instrumentation region). See also FIG. 16 (showing operation of laser tool LT with beam LB forming hole/aperture in layer T). Compare FIG. 17 (showing cutting tool CT forming holes in layer T).

Exemplary Embodiments-A

As indicated schematically in FIGS. 1B, 2A-2C, 4A and 5A, the component C may comprise a panel P configured to present a display D (e.g. panel C/P and/or display C/D configured to be operated, illuminated, back-lit, etc.) in the vehicle interior (e.g. such as for a console shown as floor counsel FC, panel shown as instrument panel IP and/or door panel P/1000, etc.); the display D is configured in operation (e.g. as selectively illuminated) to present an image IM for a vehicle occupant (e.g. on or for a user interface, display panel, control/operator, instrumentation and/or for decorative effect, etc.); the display D may be configured to present an image IM at a decorative region DR and/or an instrumentation region IR. See also FIGS. 3A-3D and 4A-4C, 6 and 6A-6D. According to an exemplary embodiment as indicated schematically in FIG. 5B, the image IM presented at the display D may be configured for a user interface/control (shown as a door lock and/or window lock); as indicated schematically in FIGS. 6A-6D, the image IM may comprise a decorative effect presented (e.g. by illumination) in a decorative region DR of the display D and/or instrumentation/messaging presented (e.g. by illumination, back-lighting, etc.) in an instrumentation region IR of the display D. According to an exemplary embodiment as indicated schematically in FIGS. 2A-2B, the component (e.g. shown as display C/D and panel C/P with display D) may comprise a display configured to provide a region for illumination configured to present instrumentation and/or decorative effect (e.g. by selective illumination from a module such as comprising an array of light emitting diodes/LED). See e.g. FIGS. 9A and 10A.

Figure 16:
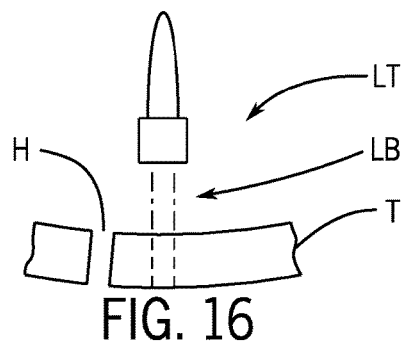
FIG. 16 is a schematic cut-away section view of a process to produce a cover for a vehicle interior component according to an exemplary embodiment.
Figure 17:
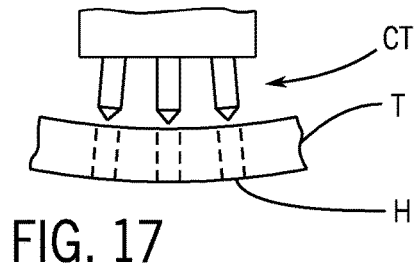
FIG. 17 is a schematic cut-away section view of a process to produce a cover for a vehicle interior component according to an exemplary embodiment.
Figure 18A:
FIGS. 18A to 18C are schematic cut-away section view of a process to produce a vehicle interior component according to an exemplary embodiment.
Figure 18B:
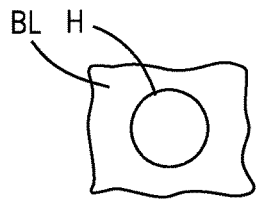
Figure 18C:
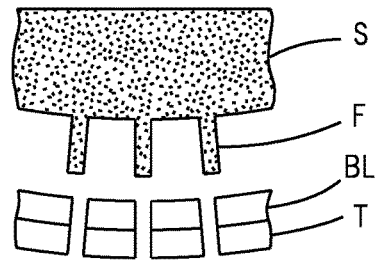
Figure 19A:
FIGS. 19A to 19C are schematic cut-away section view of a process to produce a vehicle interior component according to an exemplary embodiment.
Figure 19B:
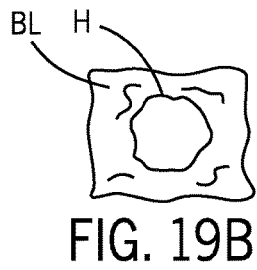
Figure 19C:
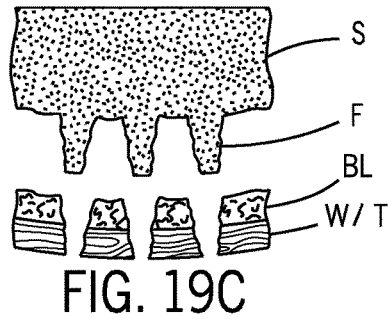
Figure 20A:
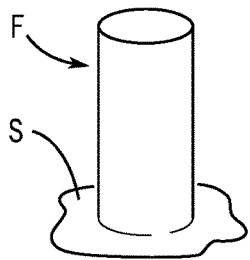
FIG. 20A is a schematic cut-away perspective view of a light guide for a vehicle interior component according to an exemplary embodiment.
Figure 20B:
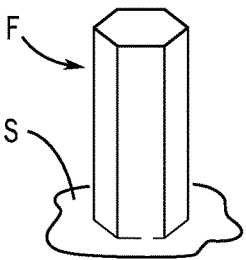
FIG. 20B is a schematic cut-away perspective view of a light guide for a vehicle interior component according to an exemplary embodiment.
Figure 20C:
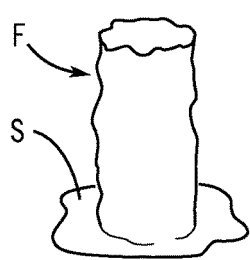
FIG. 20C is a schematic cut-away perspective view of a light guide for a vehicle interior component according to an exemplary embodiment.
Figure 20D:
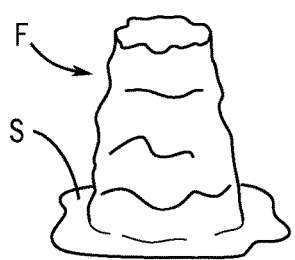
FIG. 20D is a schematic cut-away perspective view of a light guide for a vehicle interior component according to an exemplary embodiment.
Figure 21A:
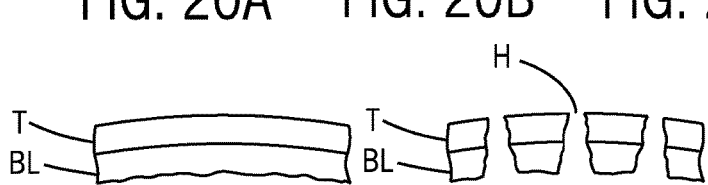
FIG. 21A is a schematic cut-away section view of a cover for a vehicle interior component according to an exemplary embodiment.
Figure 21B:
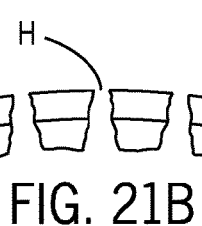
FIG. 21B is a schematic cut-away section view of a cover for a vehicle interior component according to an exemplary embodiment.
Figure 21C:
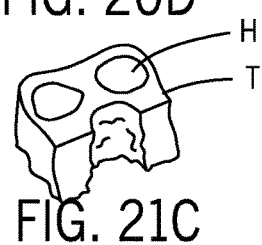
FIG. 21C is a schematic cut-away perspective view of a cover for a vehicle interior component according to an exemplary embodiment.
Figure 23:
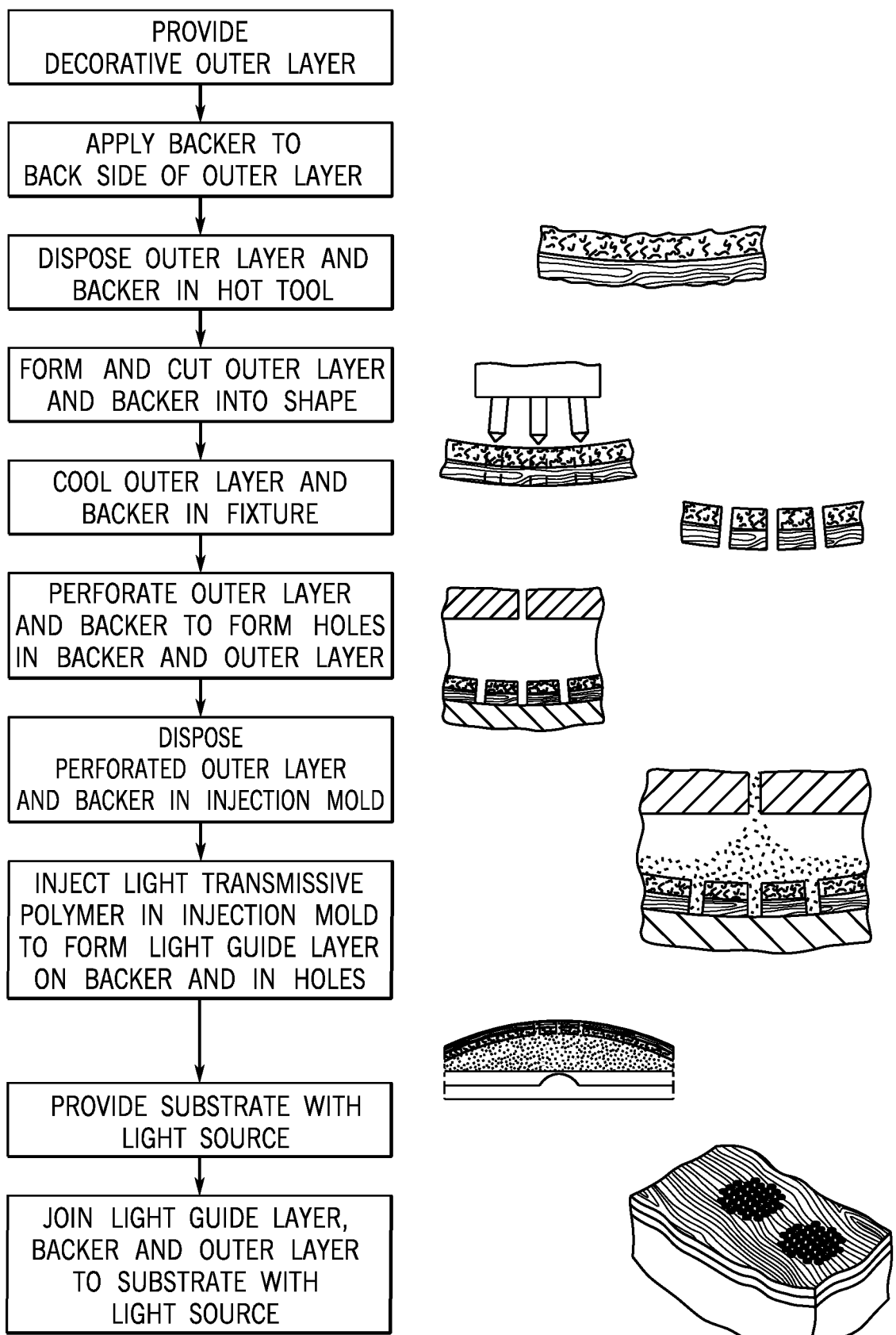
FIG. 23 is a schematic flow diagram of a method to produce a vehicle interior component according to an exemplary embodiment.

As indicated schematically according to an exemplary embodiment in FIGS. 16, 17 and 23, the formation of holes/apertures (e.g. perforations by laser tool or other apparatus/mechanical method) for the component (e.g. back-lit decorative trim component) for a vehicle interior may comprise a variety of patterns/arrangements (e.g. configured to present image SH/IM for the display on the surface of the component when illuminated by light source L and/or module M). See e.g. FIGS. 3A-3D, 6A-6D, 10A-10F, 11A-11C, 12A-12C, 13A-13B, 14A-14B and 15A-15B.

As indicated schematically according to an exemplary embodiment, the wood veneer cover/layer (front) and backing layer (behind wood veneer cover/layer) (rear) with holes/apertures (e.g. perforations formed by laser tool) provide the visual effect/surface effect for the component (e.g. back-lit trim component configured to be illuminated with light source L/M/LED) for a vehicle interior. See e.g. FIGS. 3A-3D, 6A-6D, 7, 9A and 10E-10F.

As indicated schematically according to an exemplary embodiment, the component providing the display/panel (e.g. configured to present image IM when actuated/illuminated) may comprise cover layer of a material configured to provide a visual effect at the surface (e.g. shown as a wood grain surface effect W/SE). See e.g. FIGS. 3A-3D, 6A-6D, and 10A-10F. According to an exemplary embodiment as indicated schematically, a backing arrangement (e.g. layer or layers with adhesive/coating attachable by bonding, hot press, heat activation, lamination, etc.) may be provided for the cover layer (e.g. attached behind the cover of veneer, wood veneer, wood grain, grain material, surface effect layer, etc.) to provide reinforcement (including at holes/apertures), to enhance strength, to protect from damage, to facilitate handling, to provide environmental resilience (e.g. to water, flame, etc.), for shielding and/or flexibility, etc. See e.g. FIGS. 5D, 7, 9A-9G, 10, 10A-10F, 18A-18C, 19A-19C, 21A-21C, 22A-22C and 23. According to an exemplary embodiment the backing layer may comprise a backing material such as commercially available under the name DRIBOND (e.g. #160 TSB thermo-set backer) from Lenderink Technologies of Belmont, Michigan (USA). According to an exemplary embodiment the backing layer may comprise a veneer backing material providing a carrier/coating such as commercially available (e.g. under the name PWG Veneer Backing VC300+) from PWG VeneerBackings GmbH of Walkertshofen, Germany.

As indicated schematically according to an exemplary embodiment, a component for a vehicle interior with a surface intended to be visible to an occupant when the component is installed in the vehicle interior configured to provide illumination from a light source may comprise: a base; a decorative layer coupled to the base comprising at least one hole; and a light guide coupled to the decorative layer. The light guide may comprise a first portion configured to fill the at least one hole in the decorative layer. The decorative layer may comprise a thickness generally between 0.005 inches and 0.05 inches. The decorative layer may comprise a rear surface; the light guide may comprise a second portion configured to align with the rear surface of the decorative layer and guide light from a light source to the first portion of the light guide. The decorative layer may comprise a natural material. The decorative layer may comprise a wood veneer. The component may further comprise a backing coupled to a rear surface of the decorative layer. The backing may comprise at least one backer attached to the rear surface of the decorative layer. The at least one backer may comprise a sheet material; the at last one hole may comprise a set of holes through the decorative layer and the sheet material of the at least one backer; the set of holes may be configured (a) to provide an outlet for light configured to provide illumination and/or (b) to direct light to provide illumination at the surface. The at least one hole may be configured to at least one of (a) provide an outlet for light configured to provide illumination; (b) direct light to provide illumination at the surface. The at least one hole may comprise a pattern of holes configured to provide indicia identifying at least one vehicle control. The decorative layer may comprise a backer configured to prevent illumination to pass from a light source to an outer surface of the decorative layer. The light guide may be formed within the at least one hole of the decorative layer. The light guide may comprise a light-transmissive resin material formed in the at least one hole of the decorative layer. The decorative layer may be configured to provide a visual effect; the light guide may be configured to provide a visual effect; the visual effect of the decorative layer and the visual effect of the light guide may be configured to provide a composite visual effect. The surface may be configured for a first state providing the visual effect of the decorative layer and a second state providing the composite visual effect of the visual effect of the light guide and the visual effect of the decorative layer. The at least one hole may comprise a pattern of holes; the base may comprise at least one of (a) module; (b) a switch; (c) a sensor; (d) a capacitive switch; (e) a capacitive switch sensor aligned with the pattern of holes; the pattern of holes may be configured to illuminate the decorative layer to indicate a position of the switch; the capacitive switch; the capacitive switch sensor. The component may comprise at least one of a trim panel; an armrest; a headliner; a dashboard; a console; a center console; a door panel; a steering wheel; a seat; a pillar; a roof pillar; pillar trim.

As indicated schematically according to an exemplary embodiment, a method of manufacturing a vehicle trim component may comprise the steps of: (a) providing a decorative layer; (b) providing the decorative layer in a tool; (c) at least one of forming; cutting the decorative layer into a shape; (d) forming at least one hole in the decorative layer; (e) providing the decorative layer in a mold; (f) injecting a resin in the mold to form a light guide in the at least one hole of the decorative layer; (g) providing a base; (h) joining the decorative layer with the light guide to the base. The light guide may be configured to allow illumination to pass through the at least one hole of the decorative layer. Forming the at least one hole may comprise perforating the decorative layer with a laser. The method may further comprise the step of applying a backer to an inner surface of the decorative layer. The backer may comprise a barrier configured to prevent transmission of light. The step of forming at least one hole in the decorative layer may comprise forming at least one hole in the backer to allow transmission of light through the at least one hole in the backer. The backer may comprise at least one layer of backing material. The backing material may comprise a sheet material attached to the inner surface of the decorative layer.

As indicated schematically according to an exemplary embodiment, a component for a vehicle interior comprising a surface configured to be illuminated by a light source to present an interface for an occupant of the vehicle interior may comprise: a base; a cover layer coupled to the base comprising a pattern of apertures; and a light guide coupled to the cover layer. The light guide may comprise a set of projections configured to fit in the pattern of apertures of the cover layer; the light guide may be configured to transmit illumination from the light source to present the interface through the pattern of apertures of the cover layer. The cover layer may comprise a decorative layer for the surface; the decorative layer may comprise at least one of (a) a natural material; (b) a wood veneer; (c) a grained material; (d) a sheet material providing a surface effect. The pattern of apertures may comprise at least one hole configured to at least one of (a) provide an outlet for light configured to provide illumination; (b) direct light to provide illumination. The pattern of apertures may be configured to provide a display. The display may comprise at least one of a decorative region and an instrumentation region. The instrumentation region may comprise indicia identifying at least one vehicle control. The component may further comprise a module configured to provide the light source and at least one sensor for the interface. The component may further comprise a backer configured to reinforce the cover layer. The backer may comprise at least one backing layer. The backer may comprise the pattern of apertures so that illumination from the light source passes through the backer to the surface to provide the interface. The backer may be configured to prevent illumination from the light source to an outer surface of the decorative layer other than at the pattern of apertures. The light guide may comprise a light-transmissive resin material. The light guide may comprise a resin material formed as the set of projections in the pattern of apertures. The cover layer may comprise a decorative layer configured to provide a visual effect; the light guide may be configured to provide a visual effect; the visual effect of the decorative layer and the visual effect of the light guide may be configured to provide a composite visual effect. The interface may comprise a first state providing the visual effect of the decorative layer and a second state providing the composite visual effect of the visual effect of the light guide and the visual effect of the decorative layer. The first state may comprise an unilluminated state and the second state may comprise an illuminated state.

As indicated schematically, the component/display may be provided in a variety of shapes and forms and/or with a variety of configurations/materials and/or with a variety of patterns for holes/apertures and/or with a variety of surface effects/cover arrangements and/or operated by a variety of types of modules/control systems for illumination/backlighting to serve a variety of functions within the vehicle interior (e.g. decorative/ornamental, functional/visual, integrated, instrumentation/control, etc.). See e.g. FIGS. 1B, 2A-2C, 3A-3D, 4A-4C, 5A-5B, 6, 6A-6D, 9A, 10A-10F, 11A-11C, 12A-12C, 13A-13B, 14A-14B and 15A-15B.

Exemplary Embodiments-B

According to an exemplary embodiment as shown schematically in FIGS. 1A, 1B and 2A, a vehicle V may include a vehicle interior I. The vehicle interior may provide components C such as panels, consoles, compartments, etc. Components C may provide a display D (e.g. display panel, illumination, data display, display screen, etc.) to present information, alerts, entertainment, data, etc. to a vehicle occupant (e.g. data/information as may be available from various sources such as image IM as shown in FIGS. 2A, 3A and 3B). The vehicle interior may be provided with a variety of display configurations in a variety of positions and locations to serve a variety of purposes. See e.g. FIGS. 1B and 2A.

According to an exemplary embodiment, the component may comprise a trim component, panel, console, etc. provided within the vehicle interior (e.g. instrument panel, door, seat area, cockpit, center area, overhead, etc.). See e.g. FIGS. 1B and 2A.

As indicated schematically according to an exemplary embodiment, the display D of the component may present an image IM and/or information (e.g. data/information, instrumentation, indicators, controls, entertainment, communications, etc.). See e.g. FIGS. 2A and 3B. According to an exemplary embodiment, the image may comprise a set of holes H. According to an exemplary embodiment, the component C and/or display D (if provided on the component) may provide a contoured form/shape designed/intended to integrate with the interior design/aesthetic of the vehicle V. According to an exemplary embodiment, the component C may be provided with a visual effect and formed (e.g. shaped/contoured).

According to an exemplary embodiment as shown schematically in FIGS. 5A to 5D, 9A, 9F, 9G, 14A and 14B, a component for a vehicle interior 1000 shown as a door panel may comprise a surface intended to be visible to an occupant when component 1000 is installed in the vehicle interior. As shown schematically in FIG. 5B, component 1000 may be configured to provide illumination shown as an image IM from a light source. Component 1000 may comprise a base 100, a decorative layer 210 coupled to base 100 comprising at least one hole H and a light guide 230 coupled to decorative layer 210. Light guide 230 may comprise a first portion 230a configured to fill the at least one hole H in decorative layer 210. Decorative layer 210 may comprise a thickness generally between 0.005 inches and 0.05 inches (and may be provided with backing layer BL of a thickness of 0.01 inch or in a range of between 0.005 and 0.05, e.g. of one or multiple layers). Decorative layer 210 may comprise a rear surface; light guide 230 may comprise a second portion 230b configured to align with the rear surface of decorative layer 210 and guide light from a light source to first portion 230a of light guide 230. Decorative layer 210 may comprise a natural material. Decorative layer 210 may comprise a wood veneer. The at least one hole H may be configured to at least one of (a) provide an outlet for light configured to provide illumination; (b) direct light to provide illumination. The at least one hole H may comprise a pattern of holes configured to provide indicia identifying or associated with at least one vehicle system (e.g. instrumentation, control, etc.). Base 100 may comprise at least one of (a) a switch (b) a sensor (c) a capacitive switch (d) a capacitive switch sensor aligned with the pattern of holes; the pattern of holes may be configured to illuminate decorative layer 210 to indicate a position of the switch, the capacitive switch, the capacitive switch sensor. Decorative layer 210 may comprise a substrate shown as a backing (or backer) 220 configured to prevent illumination to pass from a light source to an outer surface of decorative layer 210. Light guide 230 may be formed within the at least one hole H of decorative layer 210. Decorative layer 210 may be configured to provide a visual effect; light guide 230 may be configured to provide a visual effect; the visual effect of decorative layer 210 and the visual effect of light guide 230 may be configured to provide a composite visual effect. Component 1000 may be configured for a first state providing the visual effect of decorative layer 210 and a second state providing the composite visual effect of the visual effect of light guide 230 and the visual effect of decorative layer 210. Component 1000 may comprise at least one of a trim panel; an armrest; a headliner; a dashboard; a console; a center console; a door panel; a steering wheel; a seat; a pillar, a roof pillar, pillar trim. As shown schematically in FIGS. 9A, 9F and 9G, component 1000 may comprise a base layer or circuit board L/600 comprising a light source shown as a light emitting diode LED. As shown schematically in FIGS. 9A, 9F and 9G, backing (e.g. barrier, backing layer, backing layers, backer, etc.) 220 may comprise a first backer 220a and a second backer 220b.

As indicated schematically according to an exemplary embodiment in FIGS. 5A-5D, 9A, 9F, 9G, 4A and 4B, the component 1000 may generally be configured to provide a cover shown as layer 210 (e.g. decorative layer) configured with holes H (e.g. provided in a pattern, size and shape) with a substrate/backing 220 and with a translucent/transparent element (formed from resin R) shown as a light guide 230 with projections configured to fit into the holes H to present an image IM (e.g. by guided illumination from a light source) at the surface of the component 1000.

Figures 22A, 22B, 22C:
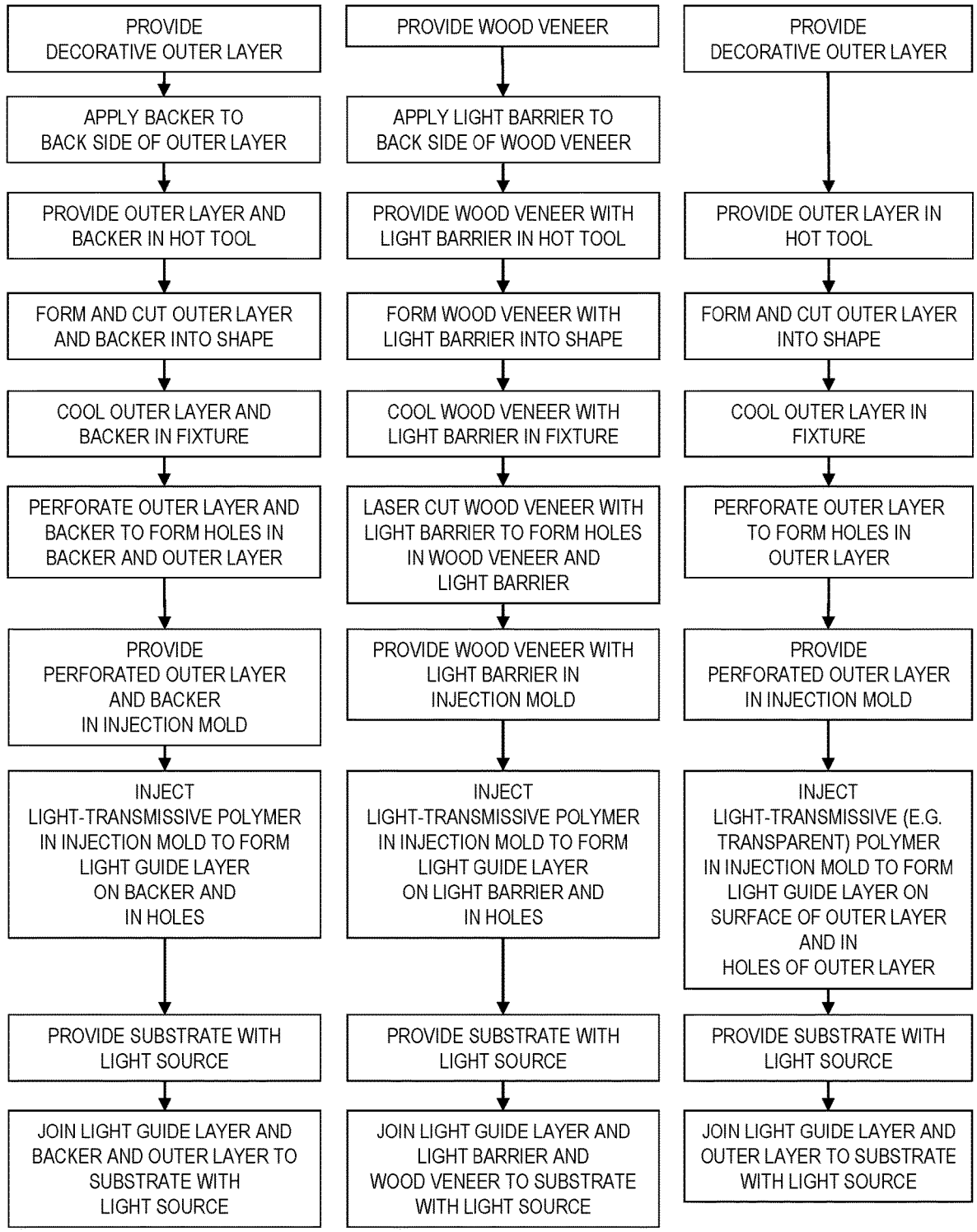
FIGS. 22A to 22C are schematic flow diagrams of methods to produce a vehicle interior component according to an exemplary embodiment.

According to an exemplary embodiment as shown schematically in FIGS. 22A to 22C, a method of manufacturing a vehicle trim component 1000 may comprise the steps of providing a decorative layer; disposing the decorative layer in a tool; at least one of forming; cutting the decorative layer into a shape; forming at least one hole in the decorative layer; disposing the decorative layer in a mold; injecting a resin in the mold to form a light guide in the at least one hole of the decorative layer; providing a base; joining the decorative layer with the light guide to the base. The light guide may be configured to allow illumination to pass through the at least one hole of the decorative layer. Forming the at least one hole may comprise perforating the decorative layer with a laser. The method may comprise the step of applying a substrate shown as a backing (or backer) to an inner surface of the decorative layer. The backing/backer may comprise a barrier configured to prevent transmission of light. Forming at least one hole in the decorative layer may comprise forming at least one hole in the backing/backer to allow transmission of light through the at least one hole in the backing/backer.

Figure 5B:
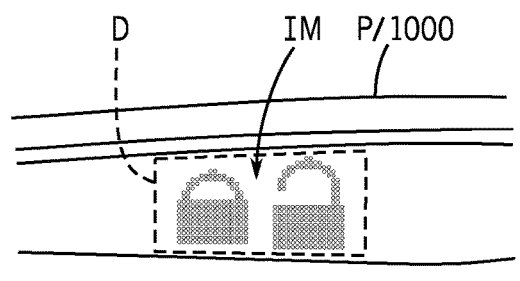
FIG. 5B is a schematic perspective cut-away view of a vehicle interior component according to an exemplary embodiment.

According to an exemplary embodiment as shown schematically in FIG. 5B, component 1000 may be configured for an illuminated state to provide illumination shown as an image IM from a light source with the light source on. Image IM may be formed by a pattern of illuminated/backlit holes H configured to provide indicia identifying or associated with at least one vehicle system (e.g. instrumentation, control, etc.). Holes H may be filled with light guide 230 to improve visibility of image IM, in particular visibility of image IM when viewed at smaller angles relative to the visible surface of component 1000. Light guide 230 may protrude into holes H to provide visibility of image IM from a wider viewing angle than would be provided without light guide 230. Light guide 230 may be configured to improve the brightness of image IM as compared to the brightness of image IM in the absence of light guide 230. Light guide 230 may be formed from a clear polycarbonate to optimize image IM color and impact strength of component 1000. Light guide 230 may be formed from a clear acrylic. Light guide 230 may comprise at least one integrally molded fastener for coupling light guide 230 to base 100.

According to an exemplary embodiment as shown schematically in FIG. 5A, component 1000 may be configured for a non-illuminated state with the light source off. As shown schematically in FIG. 5A, when the light source is off, image IM may not be visible. The pattern of holes H may be configured to provide a dead front or minimally visible image IM when not backlit; holes H may be provided in an arrangement (e.g., pattern, form, shape, size, diameter, effective diameter, dimension/dimensions, profile, etc.) configured to provide an intended visual effect (e.g. optical effect, form/shape, intensity, contrast, etc.). A diameter DM of holes H may be minimized to reduce visibility of the pattern of holes H and image IM when not backlit. Diameter DM of holes H may be specified based on a material of decorative layer 210 (for example a particular species of wood), a thickness of decorative layer 210 (for example, thinner decorative layers enable easier forming of smaller diameter holes H), the equipment used to form holes H in decorative layer (for example the capability of a laser to form smaller diameter holes H in decorative layer 210) and control systems/software used to control the forming of holes H. Decorative layer 210 may comprise a thickness generally between 0.005 inches and 0.05 inches to enable forming of decorative layer 210 into a contoured shape and/or enable forming of holes H in decorative layer 210 of diameter less than 0.5 mm. Holes H of the pattern of holes may be arranged (e.g. spaced closely together, separated, staggered, oriented, etc.) to provide improved quality of image IM (e.g. resolution, contrast, intensity, etc.). As shown schematically in FIG. 14B, a distance Y1/X1 between holes may be selected to provide minimum structural properties (such as strong or rigidity) and prevent component 1000 from being too brittle. For example, a 0.35 mm hole H diameter DM may be specified to provide a dead front appearance when not backlit; a corresponding hole spacing may be kept at a minimum of 0.45 mm center to center, or a distance Y1/X1 may specified as 0.1 mm. Holes H of the pattern of holes may be nested or aligned in rows and/or columns as shown schematically in FIG. 14A. Backing (e.g. barrier, backer, etc.) 220 may be applied or adhered to decorative layer 210 to provide rigidity to decorative layer. Backing (e.g. barrier, backer, etc.) 220 may comprise an opaque light barrier to mask/prevent visibility of portions of component 1000 when backlit. First backing/backer 220a may be configured to reinforce decorative layer during handling and/or forming. Second backing/backer 220b may be configured to comprise an opaque light barrier to mask/prevent visibility of portions of component 1000 when backlit.

Figure 5C:
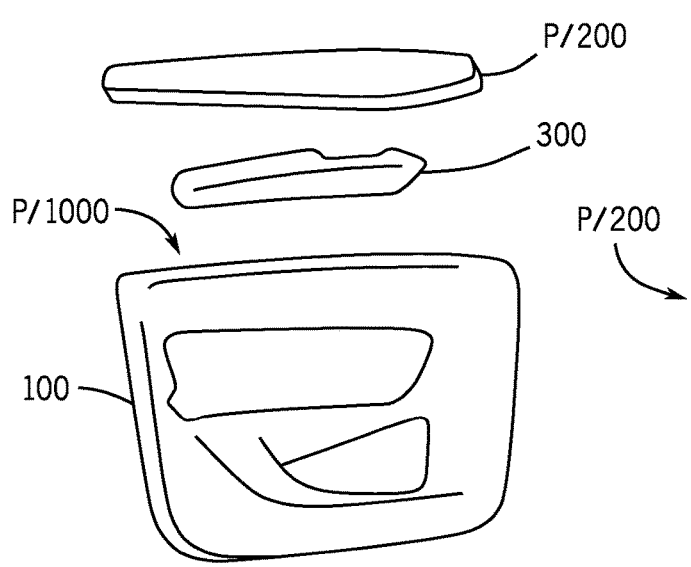
FIG. 5C is a schematic exploded view of a vehicle interior component according to an exemplary embodiment.
Figure 5D:
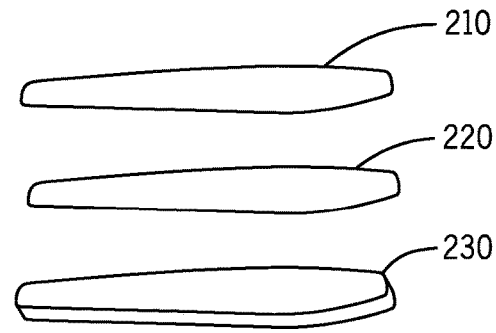
FIG. 5D is a schematic exploded view of a decorative panel of a vehicle interior component according to an exemplary embodiment.

According to an exemplary embodiment as shown schematically in FIGS. 5C and 5D, component 1000 may comprise a door panel comprising a base 100 and a decorative insert 200. Decorative insert 200 may comprise a decorative layer 210, a backing (e.g. barrier, backer, etc.) 220 and a light guide 230. Component 1000 may comprise an armrest 300, an insert 400 and a map pocket insert 500.

According to an exemplary embodiment as shown schematically in FIG. 8A, a conventional vehicle interior component 2200 may comprise a decorative layer 2210 comprising at least one hole H and a base layer or circuit board/module L/600 comprising a light source (e.g. comprising a light emitting diode LED arrangement). Conventional vehicle interior component P/2200 may comprise an air gap AG between decorative layer T/2210 and a base layer 600 and in the at least one hole of decorative layer 2210.

According to an exemplary embodiment as shown schematically in FIG. 22A, a method of manufacturing a vehicle trim component 1000 may comprise the steps of providing a decorative outer layer, applying a backing (e.g. barrier, backer, etc.) to a back side of the outer layer, disposing the outer layer and the backing/backer in a hot tool, forming and cutting the outer layer and the backing/backer into a shape, cooling the outer layer and the backing/backer in a fixture, perforating the outer layer and the backing/backer to form holes in the backing/backer and the outer layer, disposing the perforated outer layer and the backing/backer in an injection mold, injecting transparent polymer in the injection mold to form a light guide layer on the backing/backer and in the holes of the backing/backer and the outer layer, providing a substrate with a light source and joining the light guide layer, the backing/backer and the outer layer to the substrate with the light source.

According to an exemplary embodiment as shown schematically in FIG. 22B, a method of manufacturing a vehicle trim component 1000 may comprise the steps of providing wood veneer, applying light barrier to a back side of wood veneer, disposing wood veneer with light barrier in a hot tool, forming wood veneer with light barrier into a shape, cooling wood veneer with light barrier in a fixture, laser cutting wood veneer with light barrier to form holes in wood veneer and light barrier, disposing wood veneer with light barrier in injection mold, injecting transparent polymer in injection mold to form light guide layer on light barrier and in holes, providing substrate with light source and joining light guide layer, light barrier and wood veneer to substrate with light source.

According to an exemplary embodiment as shown schematically in FIG. 22C, a method of manufacturing a vehicle trim component 1000 may comprise the steps of providing decorative outer layer, disposing outer layer in a hot tool, forming and cutting outer layer into a shape, cooling outer layer in a fixture, perforating outer layer to form holes in outer layer, disposing perforated outer layer in injection mold, injecting transparent polymer in injection mold to form light guide layer on a back surface of outer layer and in holes of outer layer, providing substrate with light source and joining light guide layer and outer layer to substrate with light source.

Referring to FIG. 23, a method/process for producing the component configured with the display is shown schematically according to an exemplary embodiment to comprise the steps of applying a backer (e.g. backing arrangement of layer and/or layers) to an outer layer (e.g. cover or cover layer) and forming (e.g. in hot tool/mold) into the shape and then perforating the cover/backer with holes (e.g. pattern for illumination to present image) and then injecting a light-transmissive resin/polymer (e.g. transparent, translucent, etc.) to fill the holes and to provide a light guide arrangement and providing a substrate/structure for the component (e.g. base, substructure, etc.) and assembly to the module (e.g. providing control/computing, light source, etc.). See also FIGS. 6, 6A-6D, 7, 8A-10A-10F, 16, 17, 18A-18C, 19A-19C and 22A-22C.

It is important to note that the present inventions (e.g. inventive concepts, etc.) have been described in the specification and/or illustrated in the FIGURES of the present patent document according to exemplary embodiments; the embodiments of the present inventions are presented by way of example only and are not intended as a limitation on the scope of the present inventions. The construction and/or arrangement of the elements of the inventive concepts embodied in the present inventions as described in the specification and/or illustrated in the FIGURES is illustrative only. Although exemplary embodiments of the present inventions have been described in detail in the present patent document, a person of ordinary skill in the art will readily appreciate that equivalents, modifications, variations, etc. of the subject matter of the exemplary embodiments and alternative embodiments are possible and contemplated as being within the scope of the present inventions; all such subject matter (e.g. modifications, variations, embodiments, combinations, equivalents, etc.) is intended to be included within the scope of the present inventions. It should also be noted that various/other modifications, variations, substitutions, equivalents, changes, omissions, etc. may be made in the configuration and/or arrangement of the exemplary embodiments (e.g. in concept, design, structure, apparatus, form, assembly, construction, means, function, system, process/method, steps, sequence of process/method steps, operation, operating conditions, performance, materials, composition, combination, etc.) without departing from the scope of the present inventions; all such subject matter (e.g. modifications, variations, embodiments, combinations, equivalents, etc.) is intended to be included within the scope of the present inventions. The scope of the present inventions is not intended to be limited to the subject matter (e.g. details, structure, functions, materials, acts, steps, sequence, system, result, etc.) described in the specification and/or illustrated in the FIGURES of the present patent document. It is contemplated that the claims of the present patent document will be construed properly to cover the complete scope of the subject matter of the present inventions (e.g. including any and all such modifications, variations, embodiments, combinations, equivalents, etc.); it is to be understood that the terminology used in the present patent document is for the purpose of providing a description of the subject matter of the exemplary embodiments rather than as a limitation on the scope of the present inventions.

It is also important to note that according to exemplary embodiments the present inventions may comprise conventional technology (e.g. as implemented and/or integrated in exemplary embodiments, modifications, variations, combinations, equivalents, etc.) or may comprise any other applicable technology (present and/or future) with suitability and/or capability to perform the functions and processes/operations described in the specification and/or illustrated in the FIGURES. All such technology (e.g. as implemented in embodiments, modifications, variations, combinations, equivalents, etc.) is considered to be within the scope of the present inventions of the present patent document.

The invention claimed is:

1. A component for a vehicle interior with an interface at a surface intended to be visible to an occupant when the component is installed in the vehicle interior configured to provide illumination from a light source comprising:
    a base;
    a decorative layer coupled to the base comprising at least one hole; and
    a light guide coupled to the decorative layer;
    wherein the light guide comprises a first portion configured to fill the at least one hole in the decorative layer;
    wherein the light guide comprises a light-transmissive resin material formed in the at least one hole of the decorative layer;
    wherein the at least one hole comprises a pattern of holes;
    wherein the base comprises a sensor;
    wherein the pattern of holes is configured to illuminate the decorative layer to indicate a position of the interface;
    wherein the light guide is formed within the at least one hole of the decorative layer.

2. The component of claim 1 further comprising a backing coupled to a rear surface of the decorative layer.

3. The component of claim 1 wherein the at least one hole comprises a pattern of holes configured to provide indicia identifying at least one vehicle control.

4. The component of claim 3 wherein the decorative layer comprises a backer configured to prevent illumination to pass from a light source to an outer surface of the decorative layer.

5. The component of claim 1 wherein a visual effect of the decorative layer and a visual effect of the light guide are configured to provide a composite visual effect.

6. A component for a vehicle interior produced by a method of manufacturing comprising the steps of:
    (a) providing a decorative layer;
    (b) providing the decorative layer in a tool;
    (c) at least one of forming; cutting the decorative layer into a shape;
    (d) forming at least one hole in the decorative layer;
    (e) providing the decorative layer in a mold;
    (f) injecting a resin in the mold to form a light guide in the at least one hole of the decorative layer;
    (g) providing a base;
    (h) joining the decorative layer with the light guide to the base;
    wherein the light guide comprises a light-transmissive resin material;
    wherein the at least one hole comprises a pattern of holes configured to provide indicia.

7. The method of claim 6 wherein the light guide is configured to allow illumination to pass through the at least one hole of the decorative layer.

8. The method of claim 6 wherein forming the at least one hole comprises perforating the decorative layer with a laser.

9. The method of claim 6 wherein the step of forming at least one hole in the decorative layer comprises forming at least one hole in a backer to allow transmission of light through the at least one hole in the backer.

10. A component for a vehicle interior comprising a surface configured to be illuminated by a light source to present an interface for an occupant of the vehicle interior comprising:
    (a) a base;
    (b) a cover layer coupled to the base comprising a pattern of apertures; and
    (c) a light guide coupled to the cover layer;
    wherein the light guide comprises a set of projections configured to fit in the pattern of apertures of the cover layer;
    wherein the light guide is configured to transmit illumination from the light source to present the interface through the pattern of apertures of the cover layer;
    wherein the light guide comprises a light-transmissive resin material formed in the pattern of apertures of the cover layer;
    wherein the pattern of apertures is configured to illuminate the cover layer to indicate a position of the interface.

11. The component of claim 10 wherein the cover layer comprises a decorative layer for the surface; wherein the decorative layer comprises at least one of (a) a natural material; (b) a wood veneer; (c) a grained material; (d) a sheet material providing a surface effect.

12. The component of claim 10 wherein the pattern of apertures comprises at least one hole configured to at least one of (a) provide an outlet for light configured to provide illumination; (b) direct light to provide illumination.

13. The component of claim 10 wherein the pattern of apertures is configured to provide a display.

14. The component of claim 10 further comprising a module configured to provide the light source and at least one sensor for the interface.

15. The component of claim 10 further comprising a backer configured to reinforce the cover layer.

16. The component of claim 15 wherein the backer is configured to prevent illumination from the light source to an outer surface of the decorative layer other than at the pattern of apertures.

17. The component of claim 15 wherein the light guide comprises a resin material formed as the set of projections in the pattern of apertures.

18. The component of claim 15 wherein the cover layer comprises a decorative layer configured to provide a visual effect; wherein the light guide is configured to provide a visual effect; and wherein the visual effect of the decorative layer and the visual effect of the light guide are configured to provide a composite visual effect.

19. A component for a vehicle interior with an interface at a surface intended to be visible to an occupant when the component is installed in the vehicle interior configured to provide illumination from a light source comprising:
 a base;
 a decorative layer coupled to the base comprising at least one hole; and
 a light guide coupled to the decorative layer;
 wherein the light guide comprises a first portion configured to fill the at least one hole in the decorative layer;
 wherein the light guide comprises a light-transmissive resin material formed in the at least one hole of the decorative layer;
 wherein the at least one hole comprises a pattern of holes;
 wherein the base comprises a sensor;
 wherein the pattern of holes is configured to illuminate the decorative layer to indicate a position of the interface;
 wherein the decorative layer comprises a backer configured to prevent illumination to pass from a light source to an outer surface of the decorative layer.

20. The component of claim 19 wherein a visual effect of the decorative layer and a visual effect of the light guide are configured to provide a composite visual effect.

* * * * *